(12) United States Patent
Zammataro

(10) Patent No.: US 12,454,761 B1
(45) Date of Patent: Oct. 28, 2025

(54) SYSTEMS AND METHODS FOR PRODUCING HYDROGEN GAS FROM A WATER DISTRIBUTION SYSTEM

(71) Applicant: HydroCosm, LLC, Mendham, NJ (US)

(72) Inventor: Frank V. Zammataro, Mendham, NJ (US)

(*) Notice: Subject to any disclaimer, the term of this patent is extended or adjusted under 35 U.S.C. 154(b) by 340 days.

(21) Appl. No.: 17/187,476

(22) Filed: Feb. 26, 2021

Related U.S. Application Data

(60) Provisional application No. 62/984,613, filed on Mar. 3, 2020.

(51) Int. Cl.
| | |
|---|---|
| *C25B 1/04* | (2021.01) |
| *C01B 13/11* | (2006.01) |
| *C25B 9/17* | (2021.01) |
| *C25B 15/02* | (2021.01) |
| *C25B 15/08* | (2006.01) |

(Continued)

(52) U.S. Cl.
CPC ............... *C25B 1/04* (2013.01); *C01B 13/11* (2013.01); *C25B 9/17* (2021.01); *C25B 15/02* (2013.01); *C25B 15/081* (2021.01); *F03B 3/04* (2013.01); *F03B 13/06* (2013.01); *F05B 2220/32* (2013.01); *F05B 2220/706* (2013.01)

(58) Field of Classification Search
CPC .................................. C25B 1/04; C01B 13/11
See application file for complete search history.

(56) References Cited

U.S. PATENT DOCUMENTS

| | | | |
|---|---|---|---|
| 3,623,970 A | * | 11/1971 | Haas .......................... C25B 1/13 |
| | | | 204/266 |
| 3,754,147 A | | 8/1973 | Hancock et al. |

(Continued)

FOREIGN PATENT DOCUMENTS

| | | |
|---|---|---|
| CN | 101841277 A | 9/2010 |
| CN | 101881249 A | 11/2010 |

(Continued)

OTHER PUBLICATIONS

Machine translation of Suzuki JP 2011-058484 A (Year: 2011).*

(Continued)

*Primary Examiner* — Harry D Wilkins, III
(74) *Attorney, Agent, or Firm* — Tech Valley Patent, LLC; John Pietrangelo

(57) ABSTRACT

Methods and systems for generating hydrogen gas from a source of pressurized water, for example, from an existing water main of a water distribution system, are provided. The methods and systems employ turbine/generators and water electrolyzers electrically powered by the turbine/generators. The turbine/generators are powered by the energy available in existing water distribution systems, for example, municipal, industrial, or agricultural systems, to access energy that typically is discarded, for example, via a pressure relief valve. The hydrogen gas generated may be used to fuel hydrogen powered vehicles, for example, cars, trucks, and forklifts, or as a fuel for power generation. Excess electrical energy produced by the generator may be distributed to the local power grid. Aspects of the invention may also be used to generate oxygen gas from the electrolysis of water, and then generate ozone gas from the oxygen gas for treating water, among other uses.

22 Claims, 7 Drawing Sheets

(51) Int. Cl.
*F03B 3/04* (2006.01)
*F03B 13/06* (2006.01)

(56) References Cited

U.S. PATENT DOCUMENTS

| | | | |
|---|---|---|---|
| 6,509,652 B2 | 1/2003 | Yumita | |
| 6,864,596 B2 | 3/2005 | Maiwald et al. | |
| 7,146,918 B2 | 12/2006 | Meller | |
| 7,948,101 B2 | 5/2011 | Burtch | |
| 2003/0205458 A1* | 11/2003 | Roychowdhury | C01B 3/32 204/170 |
| 2004/0013923 A1* | 1/2004 | Molter | H01M 8/0656 429/444 |
| 2004/0066043 A1 | 4/2004 | Maiwald et al. | |
| 2004/0220701 A1 | 11/2004 | Maiwald et al. | |
| 2005/0000802 A1* | 1/2005 | Hobbs | F17C 9/04 205/637 |
| 2005/0034998 A1* | 2/2005 | Prerad | H01M 8/0656 205/628 |
| 2005/0248161 A1 | 11/2005 | Heidel | |
| 2005/0252764 A1 | 11/2005 | Meller | |
| 2006/0082159 A1 | 4/2006 | Scharfspitz et al. | |
| 2006/0118575 A1* | 6/2006 | Boyd | F17C 5/007 222/3 |
| 2007/0084718 A1* | 4/2007 | Fleming | C25B 9/17 204/232 |
| 2007/0145748 A1 | 6/2007 | Pierz | |
| 2008/0302670 A1* | 12/2008 | Boyle | C25B 15/02 205/465 |
| 2009/0179426 A1* | 7/2009 | Alvarez | F03B 11/02 415/208.2 |
| 2010/0258449 A1 | 10/2010 | Fielder | |
| 2010/0308600 A1 | 12/2010 | Statler et al. | |
| 2011/0017607 A1* | 1/2011 | Moon | F02M 25/12 205/628 |
| 2011/0266142 A1* | 11/2011 | Norman | C25B 9/05 204/266 |
| 2013/0317959 A1* | 11/2013 | Joos | C25B 9/17 205/637 |
| 2014/0158529 A1 | 6/2014 | Sivret | |
| 2016/0076509 A1 | 3/2016 | Im et al. | |
| 2018/0205102 A1* | 7/2018 | O'Brien | C01B 3/50 |
| 2020/0006942 A1 | 1/2020 | Lansing, Jr. et al. | |

FOREIGN PATENT DOCUMENTS

| | | | |
|---|---|---|---|
| CN | 106224156 A | 12/2016 | |
| CN | 109436271 A | 3/2019 | |
| CN | 110277822 A | 9/2019 | |
| CN | 110649650 A | 1/2020 | |
| EA | 024944 B1 | 11/2016 | |
| JP | 2003214312 A | 7/2003 | |
| JP | 2010203427 A | 9/2010 | |
| JP | 2011-058484 A * | 3/2011 | F03B 17/06 |
| JP | 2013-040568 * | 2/2013 | F03B 17/06 |
| KR | 20110128187 A | 11/2011 | |
| RU | 2142066 C1 | 11/1999 | |
| WO | 2001036817 A1 | 5/2001 | |
| WO | 2004031575 A1 | 4/2004 | |
| WO | 2006136022 A1 | 12/2006 | |
| WO | 2010101318 A1 | 9/2010 | |

OTHER PUBLICATIONS

Machine translation of Mizoe et al JP 2013-040568 A (Year: 2013).*
Kato, et al., "Effective Utilization of By-product Oxygen of Electrolysis Hydrogen Production," Energy, Nov. 2005, 19 pages.

* cited by examiner

SYSTEMS AND METHODS FOR PRODUCING HYDROGEN GAS FROM A WATER DISTRIBUTION SYSTEM

CROSS-REFERENCE TO RELATED APPLICATIONS

This application claims priority from pending U.S. Provisional Patent Application 62/984,613, filed on Mar. 3, 2020, the disclosure of which is included by reference herein in its entirety.

BACKGROUND OF THE INVENTION

Technical Field

Aspects of the present invention are concerned with the generation of hydrogen by the electrolysis of water. In particular, aspects of the present invention employ the readily available energy of water distribution systems not only to generate electric power for powering electrolysis, but also take advantage of the wide spread presence of water distribution systems.

Description of Related Art

Hydrogen, the most abundant element in the universe, the lightest element, and the first element on the Periodic Table, readily reacts with oxygen to form water by the following equation:

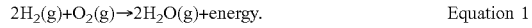

$$2H_2(g) + O_2(g) \rightarrow 2H_2O(g) + \text{energy}. \qquad \text{Equation 1}$$

Since this reaction produces energy, or is exothermic, hydrogen is widely recognized as a fuel source. Moreover, compared to fossil fuels, hydrogen can be an environmentally friendly fuel source—as indicated by Equation 1, the combustion of hydrogen does not generate any green house gases. Among other things, hydrogen gas can be used as a fuel in internal combustion engines and in fuel cells, for grid and other power applications. Specifically, hydrogen gas can be an environmental friendly fuel for use in fuel-cell powered vehicles, such as, cars, trucks, and forklifts.

However, hydrogen gas, due to its lightweight and reactivity, is not commonly found in nature, but must be produced by the processing of hydrogen rich materials, such as, hydrocarbons ($H_nC_n$) or water ($H_2O$). Conventionally, most hydrogen gas is produced from fossil fuels by steam reforming or partial oxidation of methane and by coal gasification. However, these processes release green house gases, and are thus environmentally unfriendly. In contrast, hydrogen gas can also be produced by the electrolysis of water. As known in the art, the electrolysis of water is the use of electric power to decompose water into hydrogen gas and oxygen gas by the following equation:

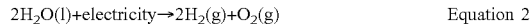

$$2H_2O(l) + \text{electricity} \rightarrow 2H_2(g) + O_2(g) \qquad \text{Equation 2}$$

As is clear from Equation 2, the generation of hydrogen gas by electrolysis requires the input of electrical energy. Accordingly, the electrolysis of water to produce hydrogen gas is environmentally friendly when the source of the electric power for the electrolysis is limited to those processes in which little or no fossil fuels are used. Typically, hydrogen gas producing processes that are environmentally friendly are limited to those processes where the electric power is provided by non-fossil fuel sources, such as, wind turbines and solar panels. Where hydrogen gas produced as a by-product of an industrial process is referred to as "grey hydrogen," and hydrogen gas produced in a process that also generates carbon dioxide ($CO_2$) is referred to as "blue hydrogen," hydrogen gas produced in a process using entirely re-usable energy sources is referred to as "green hydrogen." Aspects of the present invention facilitate the cost-effective generation and distribution of green hydrogen.

Presently, hydrogen has been used as a fuel source to power primarily electric forklifts and similar small industrial-type electric vehicles. However, with the anticipated increased demand, it is believed that the use of hydrogen as a fuel is expanding. For example, it is understood that, among other jurisdictions, the European Union (EU) is presently enforcing more clean air standards that encourage the adoption of hydrogen gas fuel, for instance, the EU now requires that large container ships reduce emissions by, among other things, employing hydrogen gas fuel. In addition, the State of California is showing leadership in exploring new hydrogen infrastructure for the over 7,000 hydrogen-fueled vehicles presently operating in that state. Also, the recently formed Colorado Hydrogen Network is expanding the use hydrogen-powered vehicles in the State of Colorado. Accordingly, it is believed that the hydrogen gas infrastructure in the U.S. and around the world will continue to grow. For example, U.S. Federal and State agencies are expected to continue to create programs to motivate hydrogen fuel-related entrepreneurs and innovation.

One example of a potential environmentally friendly process for producing hydrogen gas is disclosed in PCT Publication WO 2004/021575 of Müller, et al. In this application, Müller and his colleague propose using the potential energy provided by the headwater of a dam to drive a turbine to power an electrolyzer to produce hydrogen gas. However, this approach to producing hydrogen gas is not only limited to the presence of a water impoundment of a dam, but is also limited to distributing the hydrogen gas produced to the vicinity of the dam.

In the present invention, the inventor recognizes the limitations of such existing methods of producing and distributing hydrogen gas, and presents an alternative approach that overcomes the limitations and disadvantages of the existing art.

SUMMARY OF THE INVENTION

As noted above, the electrolysis of water to produce hydrogen requires the input of energy to drive the electrolysis reaction, Equation 2. The present invention envisions the use of readily available energy for use in powering the electrolysis reaction to produce hydrogen gas. In addition, aspects of the invention provide an effective distribution network for distributing the hydrogen gas to the end user, for example, to the user of a hydrogen-powered vehicle, such as, a car or a truck, and/or to a distributor of hydrogen gas. In brief, this source of energy is the untapped potential energy of existing water distribution systems or networks.

As known in the art, water distribution systems throughout the world are designed to distribute water, potable, or non-potable water, to the end user, for example, a homeowner, a hospital, or a factory. However, it is recognized in the art that the end user can typically only accept water at a specific limited range of pressure, for example, between 40 to 60 pounds per square inch gauge (psig) in the typical American home. However, due to, among other things, the source of the water, the location of the source of the water, and the distance the water must be transported in the water distribution system, the actual pressure in a distribution pipe or water main may vary broadly, for example, from 30 psig to 500 psig. In order to reduce this pressure to the desired end-user pressure, for example, 40-60 psig, a "pressure relief valve" is typically used.

As known in the art, a pressure relief valve (PRV) or "pressure regulating valve" is a device used in a pipeline, typically, for water, in which excess pressure beyond a predetermined pressure limit is automatically "relieved," for example, dissipated or relieved via a flow restriction through a valve or related device, when the predetermined pressure limit is met or exceeded. This ensures that the pressure in the downstream pipe does not exceed the pressure required by the end user or the pressure capacity of the piping, fixtures, and instrumentation of the downstream distribution system, as recognized, for example, in increased leakage. In the present invention, the inventor recognizes that this excess pressure, which is typically otherwise wasted, can be used as a source of energy for generating hydrogen gas. Moreover, since water distribution systems may already exist and are typically widely distributed in the very areas that hydrogen gas may be needed, for example, at hydrogen-fueled car fueling stations, aspects of the invention also overcome the distribution limitations of the existing technology.

Accordingly, one embodiment of the invention is a system for producing hydrogen gas comprising or including: a turbine having an inlet adapted to receive pressurized water from a water main and an outlet; a generator operably connected to the turbine and adapted to convert rotational energy from the turbine to produce electrical energy; and an electrolyzer adapted to electrolyze water and produce at least some hydrogen gas, the electrolyzer having an inlet operatively connected to the water main and an outlet for the at least some hydrogen gas. In one aspect, the turbine and the generator may comprise a single, integrated device.

In one aspect, the water main may be a conduit in an existing water distribution system, for example, in a municipal water distribution system, a commercial water distribution system, an industrial water distribution system, or an agricultural water distribution system, for instance, in an irrigation system. In other aspects, the water main may not be in an existing water distribution system but may be a conduit specifically provided or dedicated for implementing aspects of the invention, for example, a new water pipe. In one aspect, the water main may be one or more new pipes or conduits used to connect aspects of the invention to an existing water distribution system.

In one aspect, the electrolyzer may be one or more PEM-type electrolyzers, alkaline-type electrolyzers, or AEM-type electrolyzers. In one aspect, the system may further include a deionizer operatively connected between the water main and the electrolyzer.

In one aspect, the system may further include a control system. For example, the control system may include a communications link with a user of the hydrogen gas, for example, a hydrogen-powered vehicle owner and/or a distributor of hydrogen gas. The communications link with the user may be a wired or a wireless link. In one aspect, the control system may be configured to optimize the production of the hydrogen gas.

In one aspect, the electrolyzer may further be adapted to produce at least some oxygen gas. For instance, in one aspect, the system may further include an ozone generator adapted to receive the oxygen gas and produce ozone gas, for example, for use in water treatment, among other uses of ozone gas.

In one aspect, the system may further include the water main, for example, wherein the outlet of the turbine is in fluid communication with the water main.

In another aspect, the system may further include a hydrogen gas dispenser operatively connected to the outlet of the electrolyzer. For example, the hydrogen gas dispenser may be used to fuel a hydrogen-powered vehicle or a fleet of hydrogen-powered vehicles, or for power generation, such as, in a fuel-cell-based power generation plant.

Another embodiment of the invention is a method for generating hydrogen gas comprising or including: a) accessing a flow of pressurized water from a water supply conduit; b) directing a first portion of the flow of pressurized water to the inlet of a turbine; c) allowing the flow of pressurized water to rotate an impeller of the turbine, the impeller operatively connected to an output shaft of the turbine; d) converting the rotational energy of the output shaft of the turbine to electrical energy; e) powering an electrolyzer with the electrical energy; f) introducing a second portion of the flow of pressurized water to an inlet of the electrolyzer; g) with the electrolyzer, converting at least some of the second portion of the flow of pressurized water to at least some hydrogen gas; and h) directing the at least some hydrogen gas from the electrolyzer to a storage container. The storage container may be a storage tank, for example, a transportable storage tank (for instance, a transportable storage tank that can be transported to a hydrogen fueling station), or a fuel tank of one or more hydrogen-powered vehicles.

In one aspect, the water supply conduit may be an existing water distribution system, for example, a municipal distribution system, a commercial water distribution system, an industrial water distribution system, or an agricultural water distribution system, for instance, an irrigation system.

In one aspect, the practice of d) converting the rotational energy in the output shaft of the turbine to electrical energy may be performed using a generator.

In one aspect, the method may further include controlling the operation of the method with a controller, and, for example, the method may further include transmitting operational information to the controller. The transmitting of the operation informational to the controller may be practiced by wire and/or wirelessly. In one aspect, transmitting operational information to the controller may be practiced by requesting a hydrogen gas production, for example, by an owner of a hydrogen-powered vehicle or for fuel-celled-based electrical power generation.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

Figure 1:
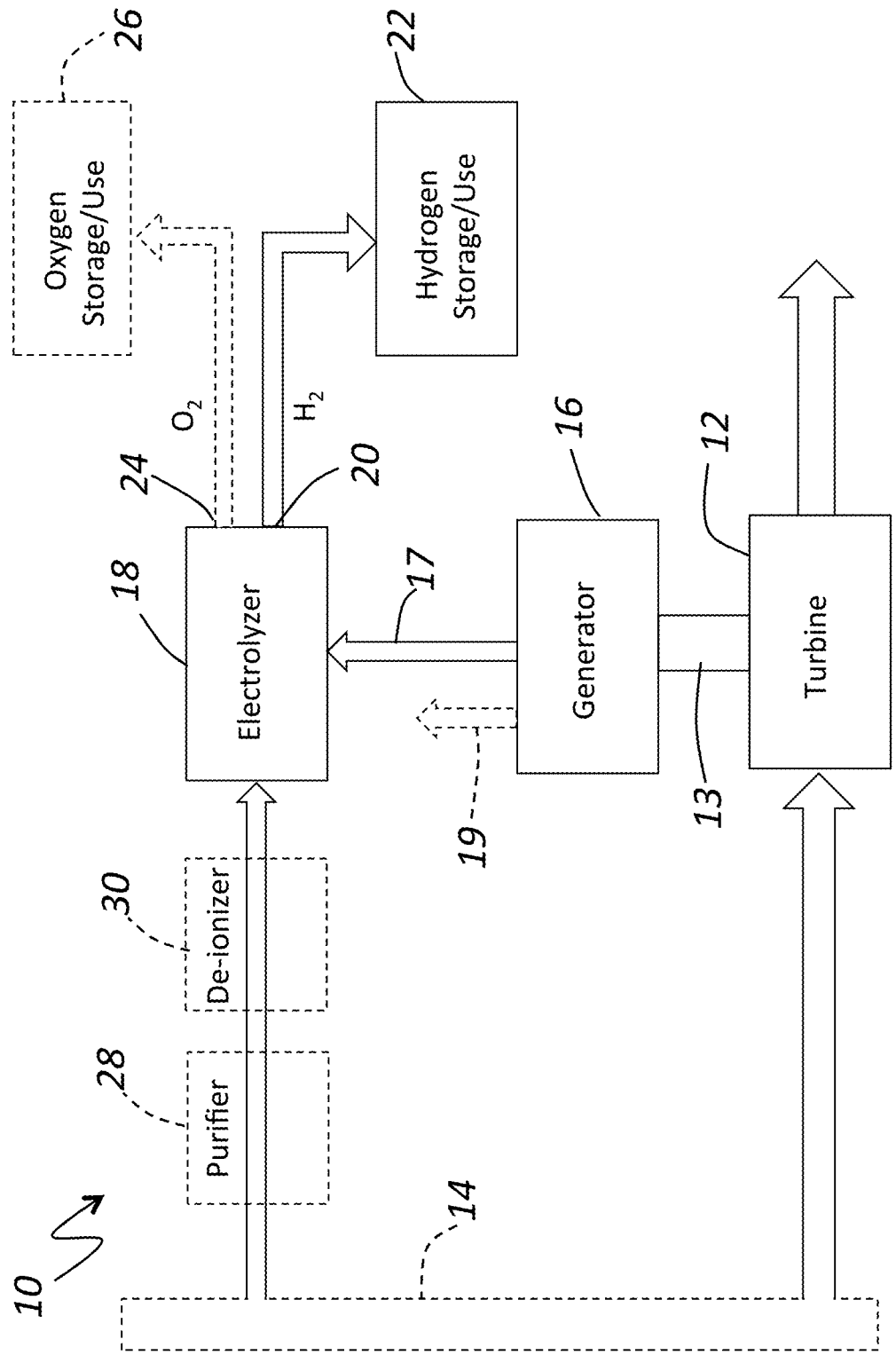
FIG. 1 is a schematic diagram of a system for producing hydrogen gas according to one aspect of the invention.

FIG. 1 is a schematic diagram of a system 10 for producing hydrogen gas according to one aspect of the invention. As shown in FIG. 1, system 10 typically includes one or more turbines 12 having an inlet operatively connected to a source of pressurized water, such as, a water main 14 (shown in phantom), and an outlet; one or more generators 16 operably connected to the turbines 12 and adapted to produce electrical energy; and one or more electrolyzers 18 adapted to receive electrical energy from the generators and to electrolyze water to produce at least some hydrogen gas ($H_2$). The electrolyzers 18 typically have an inlet adapted to receive water from a source of pressurized water, such as, the water main 14, and an outlet 20 for hydrogen gas. In one aspect, the hydrogen gas may be forwarded to one or more storage devices or to one or more uses 22, for example, to provide fuel for a hydrogen-powered vehicle, for instance, for a fuel cell electric vehicle (FCEV). In one aspect, the electrolyzer 18 may also be adapted to produce at least some oxygen gas ($O_2$) and discharge the oxygen gas via an outlet 24 and direct the oxygen gas to one or more storage devices or uses 26 (shown in phantom), for example, for water treatment.

According to aspects of the invention, "pressurized water" in water main 14 may comprise substantially water ($H_2O$) having a pressure greater than the prevailing atmospheric pressure, for example, about 14.7 pounds per square inch gauge (psig) or alternately about 1 atmosphere (atm). In one aspect, the pressurized water may be referred to as water at "super atmospheric pressure," that is, at a pressure greater than the prevailing atmospheric pressure. Typically, according to aspects of the invention, "pressurized water" may comprise water at a pressure of at least a 10 psig, but typically, the pressurized water may be at a pressure of at least 50 psig. In one aspect, the pressurized water may typically have a pressure of between 50 psig and 150 psig, for example, between 60 psig and 100 psig. In one aspect, the water in main 14 and other sources disclosed herein may be described as actively pressurized water.

According to aspects of the invention, turbine 12 may be any type of turbo machinery configured or adapted to receive a flow of pressured fluid, such as, pressurized water, and convert the energy of the pressurized fluid into kinetic energy in the form of torque and rotation of a turbine output shaft 13. For example, turbine 12 may be a water turbine, as known in the art, for example, a water turbine having a plurality of impellers mounted to a shaft or rotor, for example, a shaft operatively connected to output shaft 13.

Similarly, generator 16 may be any type of device configured or adapted to receive torque and rotation from shaft 13, or similar mechanical structure, and generate electrical power, and that power can be used, among other things, to electrically power electrolyzer 18 via electrical connection 17. As shown in FIG. 1, generator 16 may also electrically power other devices in system 10 or external systems, as indicated by electrical connection 19, shown in phantom.

In one aspect, as discussed further below, turbine 12, shaft 13, and generator 16 may comprise a single, integrated device performing the combined function of converting the potential energy of a source of pressurized water, for example, from water main 14, to electrical energy to power electrolyzer 18.

In one aspect, electrolyzer 18 may be any device configured or adapted to convert water (liquid $H_2O$) to at least some hydrogen gas ($H_2$). However, conventionally, at least some oxygen gas ($O_2$) is also generated as a by-product of the generation of the $H_2$ gas. In one aspect, electrolyzer 18 may be a proton exchange membrane (PEM)-type electrolyzer, an alkaline-type electrolyzer, or an anion exchange membrane (AEM) electrolyzer, among others, as known in the art.

In one aspect, the supply of energy to system 10 may be provided by any convenient source of pressurized water. However, in one aspect, the energy may be provided by pressurized water in an existing water distribution system, for example, from an existing municipal; industrial; residential; commercial, for instance, a wastewater treatment system; and/or agricultural water distribution system, for instance, an irrigation system. In one aspect, the source of pressurized water may be a source of potable pressurized water, for example, from a drinking water distribution system. As indicated in FIG. 1, access to the existing water distribution system may be provided by tapping into a water main 14 and directing pressurized water from the water main 14 to at least turbine 12. However, in one aspect, pressurized water from water main 14 may be directed to both turbine 12 and to electrolyzer 18. As will be discussed further below, access to water main 14 may be affected by using various valves and fittings, as is typical in the art.

As will be apparent to those of skill in the art, since the present electrolyzer technology may be limited in the quality of water that can be effectively electrolyzed, that is, efficiently and continuously, in one aspect of the invention, the water introduced to electrolyzer 18 may be treated to optimize operation of electrolyzer 18. In one aspect, prior to introduction to electrolyzer 18, purifier 28 and/or de-ionized by deionizer 30, among other treatments, may first purify the pressurized water. Purifier 28 may be any conventional water purification device, for example, one or more screens, one or more filters, one or more distillation devices, one or more sedimentation devices, one or more chemical treatments, and/or one or more electromagnetic radiation treatments, such as, with ultraviolet (UV) light, among other purification treatment. For example, in one aspect, the pressurized water introduced to electrolyzer 18 may be treated to conform to the desired water input parameters of the electrolyzer being used. For instance, the pH, conductivity, and contaminant content (for example, in parts per million [ppm]), among other things, may be monitored and regulated to ensure compatibly with the desired ranges of the electrolyzer being used.

Deionizer 30 may be any conventional water deionization and/or demineralization device, for example, a device containing an ion-exchange resin and/or a device employing electro-deionization. In one aspect, the pressurized water introduced to deionizer 30 may be monitored and regulated to ensure compatibly with the desired ranges of the deionizer being used.

Figure 2:
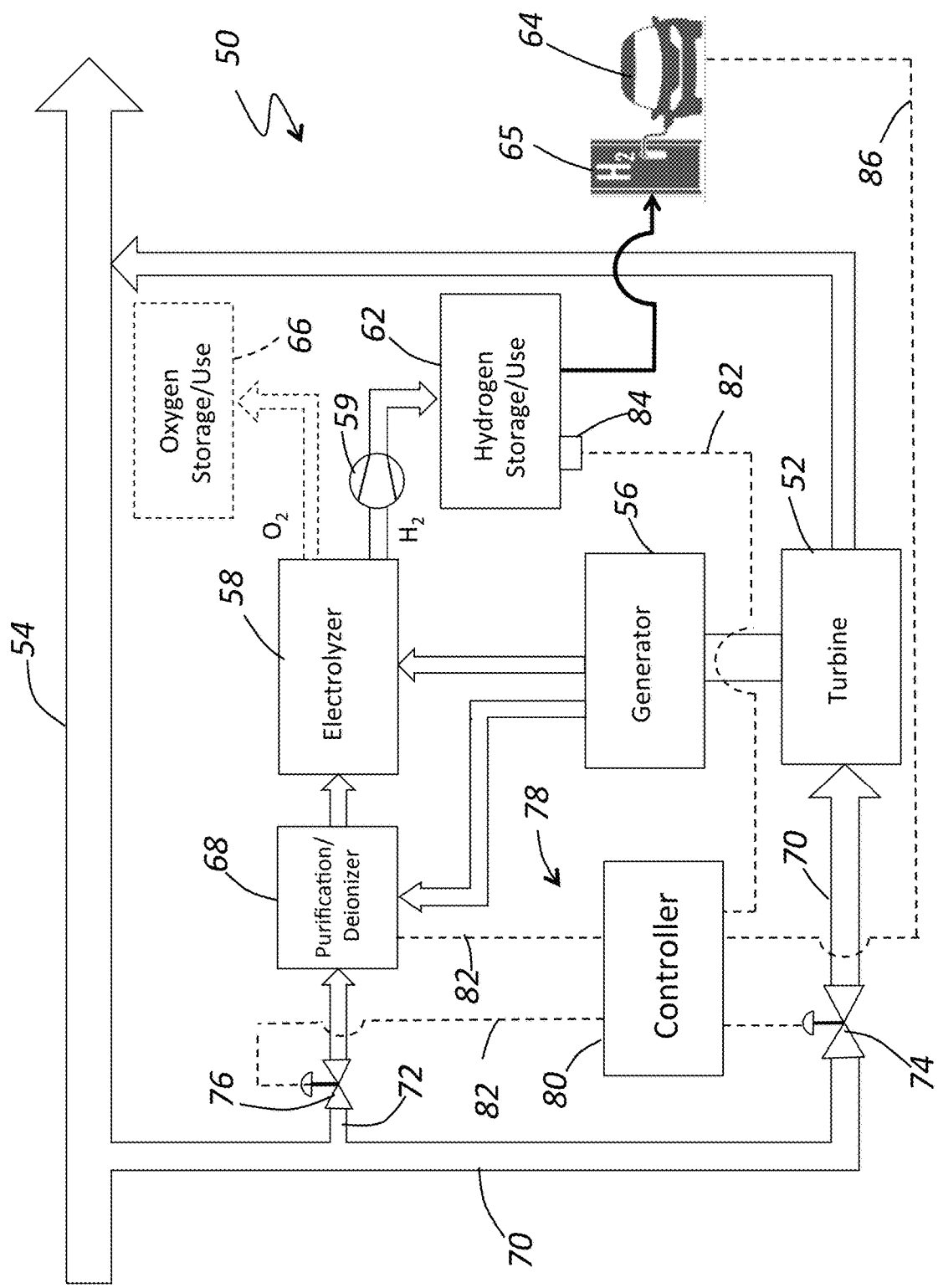
FIG. 2 is a schematic diagram of a system for producing hydrogen gas according to another aspect of the invention.

FIG. 2 is a schematic diagram of a system 50 for producing hydrogen gas according to another aspect of the invention. As shown in FIG. 2, in a fashion similar to system 10 shown in FIG. 1, system 50 may include one or more turbines 52 having an inlet operatively connected to a source of pressurized water, such as, a water main 54, and an outlet; one or more generators 56 operably connected to the turbines 52 and adapted to produce electrical energy; and one or more electrolyzers 58 adapted to receive electrical energy from the generators 56 and to electrolyze water to produce at least some hydrogen gas ($H_2$). The electrolyzers 58 typically have an inlet adapted to receive water from a source of pressurized water, such as, the water main 54, and an outlet for hydrogen gas. As shown in FIG. 2, the hydrogen gas may be forwarded to one or more storage devices or one or more uses 62, for example, into a hydrogen-powered vehicle 64 via hydrogen dispenser 65. In one aspect, system 50 may include one or more compressors 59 adapted to compress or pressurize at least some of the hydrogen gas generated by electrolyzer 58, for example, for storage or use 62. In one aspect, the electrolyzer 58 may also be adapted to produce at least some oxygen gas ($O_2$) and direct the oxygen gas to one or more storage devices or uses 66 (shown in phantom). In one aspect, the oxygen gas produced by may used to generate ozone gas in an ozone generator, and the ozone gas may be used, for example, for water treatment; for a mining operation, for example, for use in enhancing the extraction of gold or other metals; and/or for steel production, among other uses of the ozone gas. System 50 may also include appropriate pretreatment 68 of the water prior to electrolyzer 58, for example, purification and/or deionization. The components of system 50 shown in FIG. 2 may have all the attributes of the corresponding components of system 10 shown in FIG. 1.

As shown in FIG. 2, in one aspect of the invention, turbine 52 may be operatively connected to water main 54 via one or more conduits or pipes 70. In one aspect, electrolyzer 58 may also be operatively connected to water main 54 via one or more conduits or pipes 70 and one or more conduits or pipes 72. As shown in FIG. 2, the flow of water from water main 54 via conduits 70 and 72 may be regulated or controlled by one or more valves 74 and 76. Valves 74 and 76 may be any form of conventional valve, including a gate valve or a ball valve, among other types of valves, but in one aspect, regardless of the type of valve mechanism used, valves 74 and 76 may typically comprise control valves. That is, valves 74 and/or 76 may have automated control mechanisms, such as, electro/pneumatic control mechanisms, where the operation of valves 74 and/or 76 may be remotely manipulated, for example, by an electronic control system 78. Though two valves 74 and 76 are shown in FIG. 2, it is envisioned that system 50 may have further valves, including automatically—or automatedly-controlled, for example, automated flow control valves and/or manually operated valves, for example, isolation valves.

In one aspect of the invention, as shown in FIG. 2, system 50 may typically include a control system 78. Control system 78 may typically include a controller 80 and numerous control and monitoring connections 82 distributed about system 50 and communicating, by wire or wirelessly, with controller 80. According to aspects of the invention, control system 78 may be used to monitor, control, and/or optimize the operation of system 50. For example, in one aspect, control system 78 may be used to optimize the generation, production, and/or availability of hydrogen gas to, for example, provide a desirable "just in time" availability of hydrogen gas, for instance, for one or more hydrogen-powered vehicles 64, such as a fuel cell electric vehicle (FCEV). As known in the art, the hydrogen gas may be provided to the one or more hydrogen-powered vehicles 64 for fueling at nominal pressures of 35 megaPascals [MPa] [~5,000 psig] and 70 MPa [~10,000 psig].

Controller 80, and any controller disclosed herein, may comprise one or more programmable logic controllers (PLCs), computer processors, and related hardware and software. In one aspect, the controller 80, or one or more devices remote from controller 80 and in communication, by wire and/or wirelessly, with controller 80, may have hardware and software configured to enhance the desired operation and delivery of the hydrogen gas (and oxygen gas), for instance, as needed. For example, in one aspect of the invention, controller 80, and any controller disclosed herein, or a remote device may include one or more processors having software configured to monitor and/or control the operation of system 50 and the production and/or storage of hydrogen gas (and oxygen gas). For instance, in one aspect, controller 80 may include software configured to monitor the demand of hydrogen gas, for example, from one or more users of one or more FCEVs 64, in order to regulate the production of hydrogen from one or more systems 50, for example, one or more remote and/or distributed systems 50. In one aspect, the production and/or storage of hydrogen gas may be monitored and controlled based upon the location of the one or more users of one or more FCEVs 64 and the proximity of the one or more users of one or more FCEVs 64 to the one or more systems 50. For example, in one aspect, controller 80 may be adapted to enhance the sequencing or timing of the operation and production of system 50 to enhance the availability of hydrogen gas at the one or more systems 50 to enhance the likelihood of "just-in-time" availability of the hydrogen gas where needed or requested.

According to aspects of the invention, system 50 may include various sensors and actuators that, with connectivity to controller 80, may be used to operate, manipulate, and optimize the operation of system 50. For example, in one aspect, valves 74 and 76 may include automated controllers, such as, electro/pneumatic actuators, that can be monitored and controlled by controller 80, for example, based upon user input and/or computer algorithm. In another aspect, hydrogen storage 62 may include one or more sensors 84. One or more sensors 84 may be a pressure sensor, a flow meter, a volume sensor, a temperature sensor, and/or humidity sensor (for the hydrogen gas, for the oxygen gas, and/or for the local environment), among other sensors that may be used. According to one aspect of the invention, the one or more sensors 84 shown in FIG. 2, typically, a plurality of sensors 84 distributed about system 50, with control system 78 may be used to monitor and/or record the operation of the components of system 50, for example, of turbine 52 or generator 56, to determine, establish, and/or optimize one or more "duty cycles" of system 50 and/or one or more components of system 50. As known in the art, a duty cycle is the typical variation of the operation of a component or system over a period of time, for example, over a 24-hour period. The duty cycle may be expressed as a percentage or in units of time, such as, hours. According to one aspect of the invention, a given production rate of hydrogen (and/or of oxygen and/or of ozone), a hydrogen (and/or oxygen and/or ozone) demand, or an amount of energy generated, among other things, may be associated with one or more duty cycles of system 50 and/or one or more duty cycles of a component of system 50, for example, a duty cycle of turbine 52, of generator 56, and/or of electrolyzer 58.

In one aspect, controller 80 of control system 78 may communicate with external users or operators as indicated by communication link 86 in FIG. 2, which may be a wired or a wireless communication link. For example, in one aspect, communication link 86 may communicate wirelessly with a consumer or user, for instance, with a smart device, such as, a smart phone or a tablet of an owner of a hydrogen-fueled vehicle 64, or a wireless communications system of a hydrogen-fueled vehicle 64, and communication link 86 may be used to communicate a hydrogen gas purchase or a hydrogen gas demand to control system 78.

Figure 3:
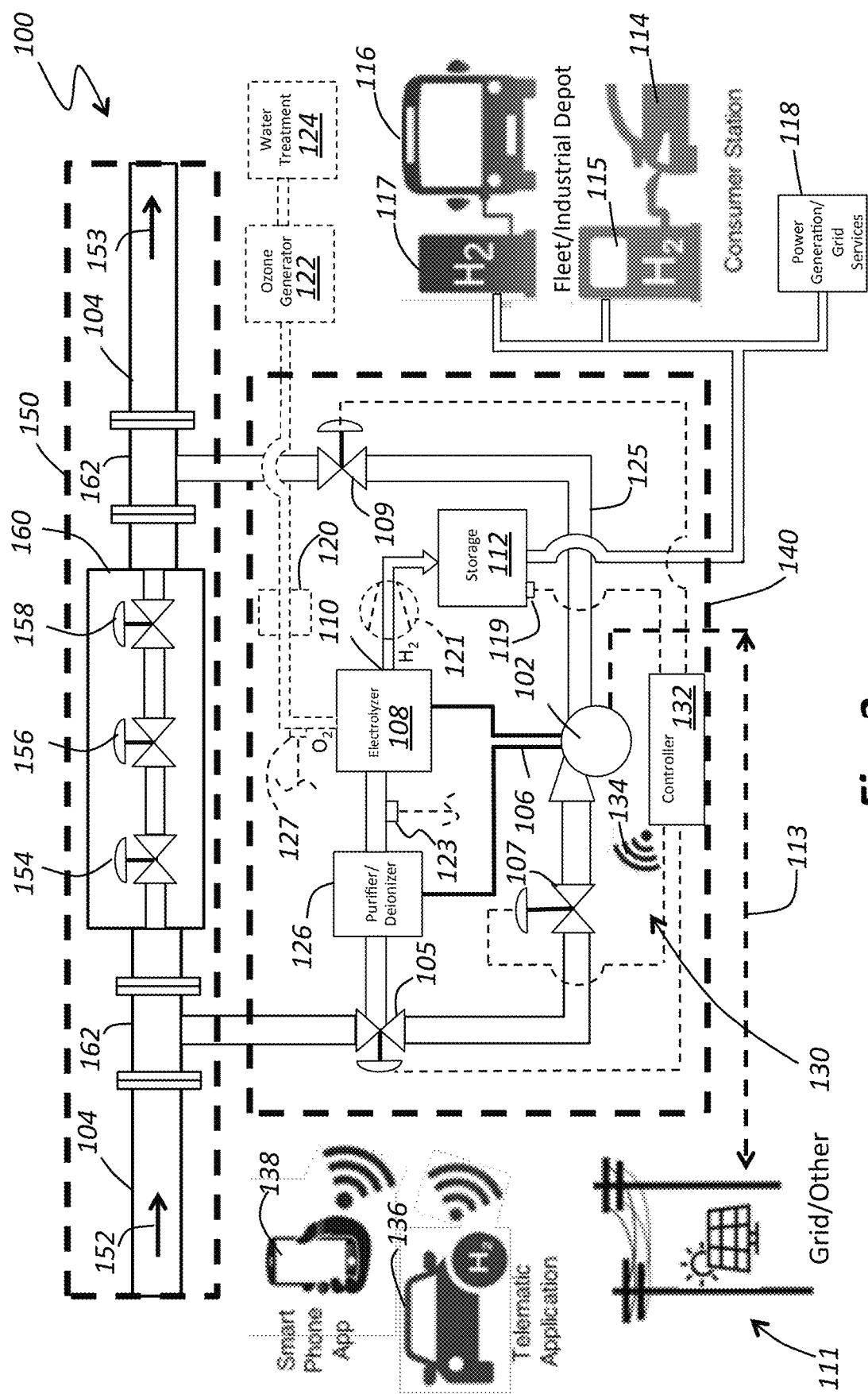
FIG. 3 is a schematic diagram of a system for producing hydrogen gas according to further aspect of the invention.

FIG. 3 is a schematic diagram of a system 100 for producing hydrogen gas according to a further aspect of the invention. As shown in FIG. 3, in a fashion similar to system 10 shown in FIG. 1 and to system 50 shown in FIG. 2, system 100 may include one or more turbine/generators 102, that is, a single device performing the function of a turbine and a generator, having an inlet operatively connected to a source of pressurized water, such as, from water main 104 via valves 105 and 107, is adapted to produce electrical energy at one or more electrical outlets 106, and an outlet; and one or more electrolyzers 108 adapted to receive electrical energy from the turbine/generator 102 and to electrolyze water and produce at least some hydrogen gas ($H_2$). As shown in FIG. 3, in one aspect, the outlet from turbine generator 102 may be directed to water main 104, for example, via one or more valves 109, for example, a control valve. The components of system 100 shown in FIG. 3 may have all the attributes of the corresponding components of system 10 shown in FIG. 1 and of system 50 shown in FIG. 2.

As shown in FIG. 3, in one aspect, system 100 may also transmit electrical power to and/or receive electrical power from a local or remote power source 111, for example, the local or remote electrical grid and any local or remote solar power or wind power generators, and the like. For example, system 100 may provide electrical power to and/or receive electrical power from power source 111, for example, to and/or from turbine/generator 102 via electrical conduit or connection 113 (as indicated by the double arrow of connection 113).

The electrolyzer 108 typically has an inlet adapted to receive water from as source of pressurized water, such as, the water main 104, and an outlet 110 for hydrogen gas. The hydrogen gas from electrolyzer 108 may be forwarded to one or more storage devices 112 or to one or more uses, for example, to fuel a hydrogen-powered vehicle 114 via hydrogen dispenser 115, to fuel a fleet of vehicles 116 dispenser 117, and/or provide a source of fuel for electrical power generation 118, for example, to forward to the local electric grid or other electrical grid services. In one aspect, the hydrogen gas produced by electrolyzer 108 may be compressed or pressurized, for example, prior to storage 112. This compression may be provided by one or more compressors 121 (shown in phantom). In one aspect, the hydrogen gas from electrolyzer 108 may be compressed to at least 500 bar [~7,250 psig], but typically may be compressed to between 700 bar [~10,000 psig] and 1000 bar [~14,500 psig], for example, for storage under pressure in storage 112. In one aspect, storage 112 may include a plurality of hydrogen storage cylinders that may be used to dispense the hydrogen to a local or remote end user. In one aspect, larger hydrogen storage tanks may be used to distribute the hydrogen gas, for example, on a tanker truck or a tanker rail car.

In one aspect, the electrolyzer 108 may also be adapted to produce at least some oxygen gas ($O_2$) and direct the oxygen gas to one or more storage devices 120 or uses (shown in phantom), for example, for ozone generation 122 (shown in phantom) for water treatment 124 (shown in phantom), among other uses of oxygen and/or ozone gas. System 50 may also include appropriate pretreatment 126 of water prior to electrolyzer 108, for example, purification and/or deionization, as disclose herein.

In a fashion similar to system 50 shown in FIG. 2, in one aspect of the invention, system 100 shown in FIG. 3 may typically include a control system 130. Control system 130 may typically include a controller 132 and numerous control and monitoring connections distributed about system 100 and communicating, by wire or wirelessly, with controller 132. According to aspects of the invention, control system 130 may be used to monitor, control, and/or optimize the operation of system 100. For example, in one aspect, control system 132 may be used to optimize the generation, production, and/or availability of hydrogen gas to, for example, provide a desirable "just in time" availability of hydrogen gas, for instance, for one or more hydrogen-powered vehicles 114. Controller 132 may comprise one or more programmable logic controllers (PLCs), computer processors, and related hardware and software.

According to aspects of the invention, system 100 may include various sensors and actuators that, with connectivity to controller 132, may be used to operate, manipulate, and optimize the operation of system 100. For example, in one aspect, valves 105, 107, and/or 109 may include automated controllers, such as, electro/pneumatic actuators, that can be monitored and controlled by controller 132, for example, based upon user input and/or computer algorithm. In another aspect, hydrogen storage 112 may include one or more sensors 119. One or more sensors 119 may be a pressure sensor, a volume sensor, and/or a temperature sensor, among other sensors that may be used, the output of which may be communicated, by wire or wirelessly, to controller 132 for use in controlling the operation of system 100. In another aspect, the oxygen gas outlet from electrolyzer 108 may include one or more sensors 127. One or more sensors 127 may be a pressure sensor, a volume sensor, an oxygen concentration sensor, and/or a temperature sensor, among other sensors that may be used, the output of which may be communicated to controller 132 for use in controlling the operation of system 100.

In another aspect, the water inlet to the electrolyzer 108 may include one or more sensors 123. One or more sensors 123 may be a pressure sensor, a flow sensor, and/or a temperature sensor, among other sensors that may be used, the output of which may be communicated, by wire or wirelessly, to controller 132 for use in controlling the operation of system 100. In one aspect, sensor 123 may be a conductivity sensor and/or a pH sensor, for example, to monitor the quality and/or purity of the water introduced to electrolyzer 108.

In one aspect, controller 132 of control system 130 may communicate with external users or operators as indicated by communication link 134 in FIG. 3, which may be a wired or a wireless communication link. For example, in one aspect, a wireless communication link 134 may communicate wirelessly with a consumer, system operator, or other user. For instance, in one aspect, system 100 may communicate via controller 132, or a related device, with an owner of a hydrogen-fueled vehicle 136 or with an application (or "app") operating in a hydrogen-powered vehicle 136 and/or on a mobile device 138, such as, a smart phone, among other devices, that may communicate with control system 130.

Figure 4:
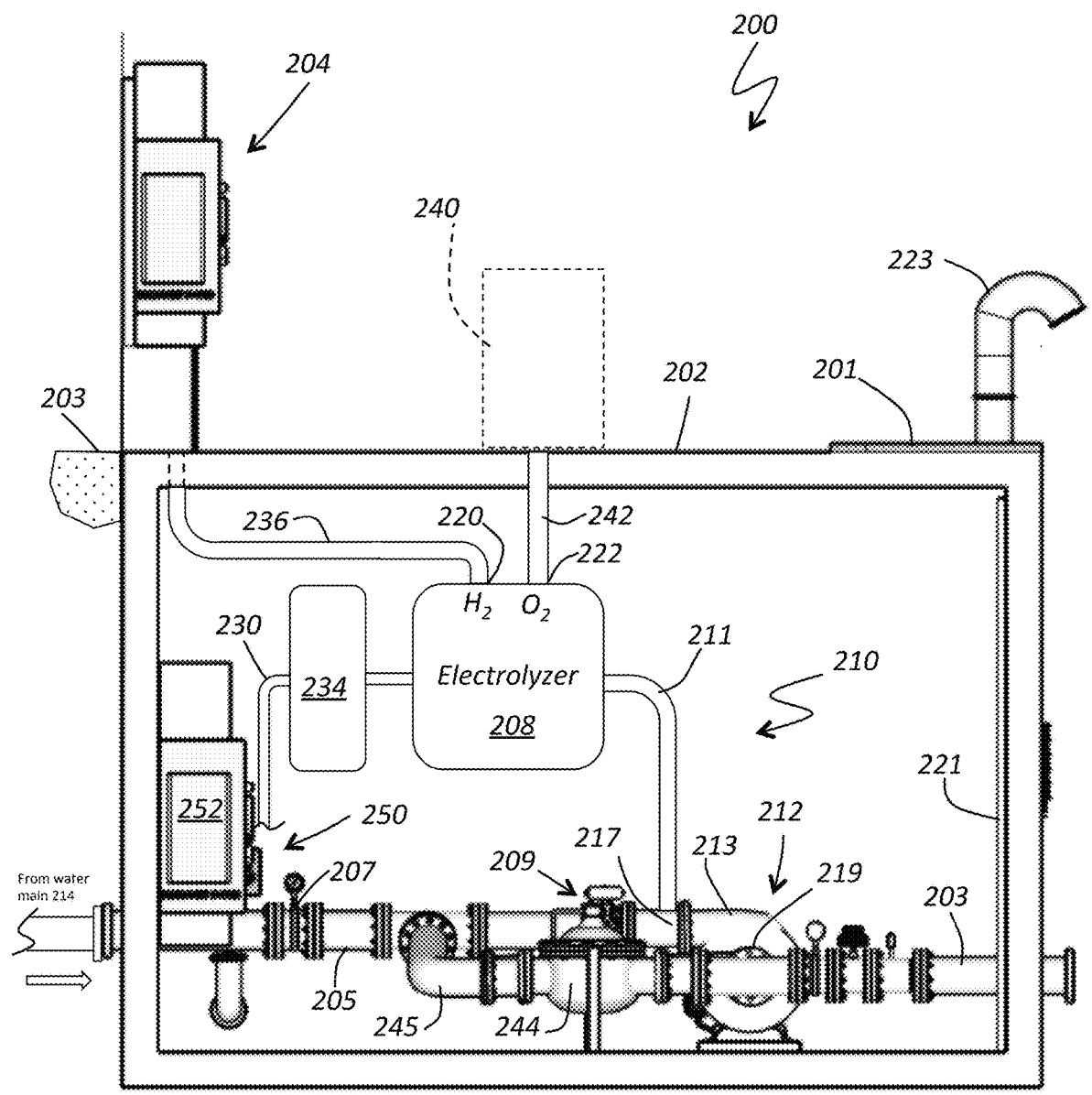
FIG. 4 is a schematic side elevation view of an arrangement of an enclosure containing a system for producing hydrogen gas according to a further aspect of the invention.
Figure 5:
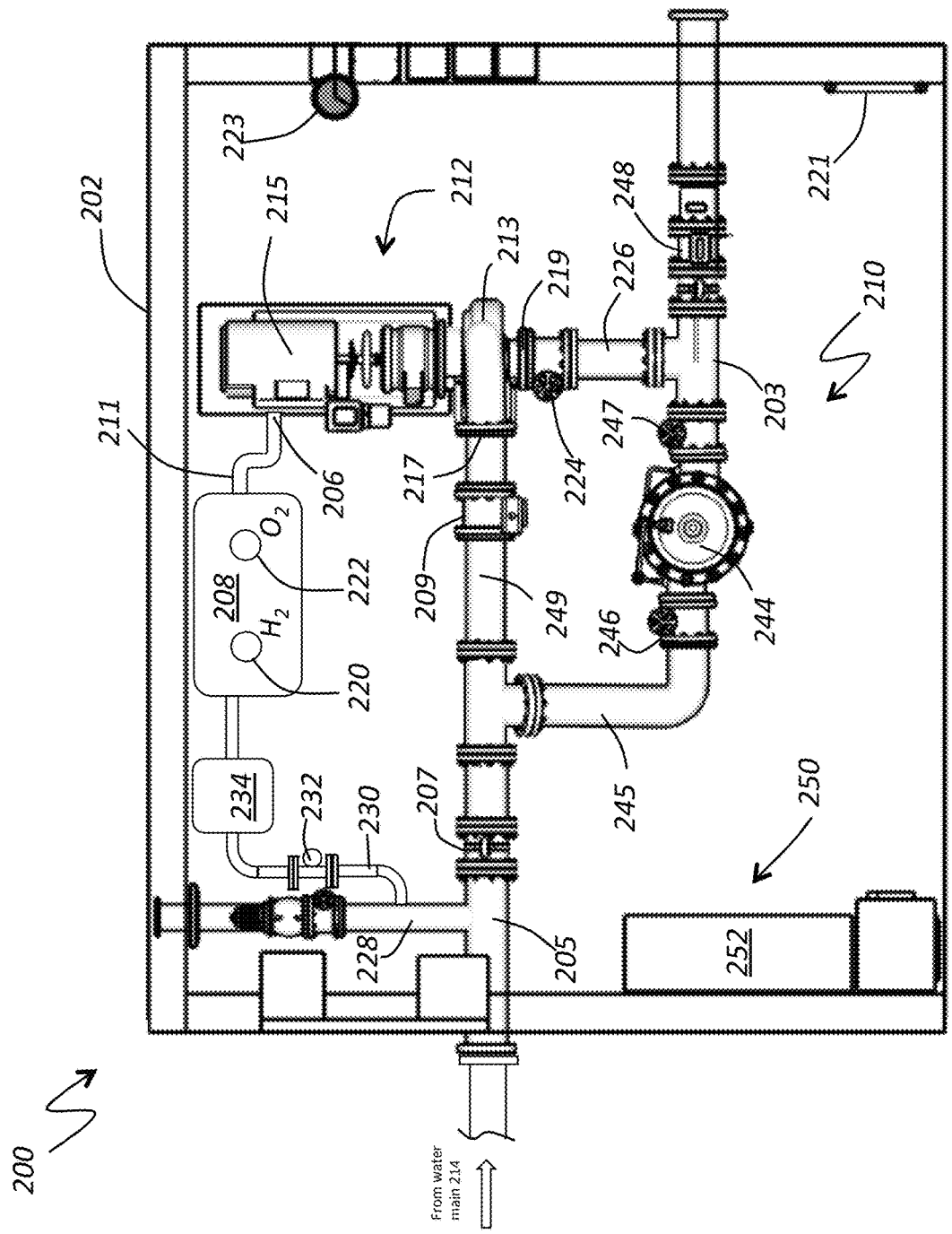
FIG. 5 is a schematic plan view of the arrangement shown in FIG. 4.

In one aspect of the invention, system 100, or at least a major portion of the components of system 100 may be positioned in an enclosure 140, for example, a structure, a building, or a portion of building. For example, in one aspect, at least a portion of the enclosure 140 may be positioned underground, that is, at least partially beneath the surface of the ground or plane in which enclosure 140 is located. For example, in one aspect, enclosure 140 may be positioned substantially entirely underground, or subterranean, where only access portals or conduits may be visible to the eye. Accordingly, in one aspect systems and method are provided that are characterized as having "stealth," for example, a system and a method for the stealth generation of hydrogen gas. For example, in one aspect, system 100 shown in FIG. 3 may be located in an enclosure 140 that is substantially undetectable or unnoticeable, for example, to the casual observer. In one aspect, methods and systems according to aspects of the invention may be located at locations where stealth is desirable, for example, at a commercially or militarily sensitive location, for instance, at a military base or airfield or at an industrial facility, among other locations. In one aspect, the enclosure 140 may be referred to as a "vault" containing most, if not all, of the components of system 100, or of system 50, or of system 10. FIGS. 4 and 5 provide further details of a typical enclosure or vault that may be used to contain aspects of the invention.

As also shown in FIG. 3, water main 104 providing at least some of the pressurized water to system 100 may have specific features according to one aspect of the invention, for example, features that allow the water main 104 to be accessed for providing a source of pressurized water to system 100, or to system 50, or to system 10. For example, according to one aspect of the invention, water main 104 may comprise a conduit, for instance, an existing conduit, for transferring water, for example, as part of a residential, municipal, commercial, industrial, or agricultural water distribution system. The typical direction flow of water in water main 104 is indicted by arrows 152 and 153 in FIG. 3, where 152 represents the "upstream flow" and arrow 153 represents the "downstream flow." The extents of the existing water distribution system may be identified in FIG. 3 by the dashed line 150. As shown in FIG. 3, the existing water distribution system may include one or more water mains 104 and one or more valves 154, 156, and 158, and one or more convectional pipe fittings, such, as elbows, bends, flanges, pipe hangers, and instrumentation as is typical. As known the art, one or more valves 154, 156, and 158 may be located in an enclosure 160, for example, an above ground or a subterranean vault having access to valves 154, 156, and 158, for example, for manipulation, maintenance, and/or servicing.

As is typical in the art, an existing water main 104 may include at least one valve 156 that functions as a "pressure relief valve," that is, a value designed and operated to reduce the pressure of the water in water main 104 from a first pressure in the upstream flow 152 to a second, typically, lower pressure in the downstream flow 153. As is known in the art, a typical water supply may, for example, due to a source at a higher elevation, have a pressure greater than the water pressure required or desired by the end user, for example, a home owner, a hospital, or semiconductor fab. Accordingly, pressure relief valve 156 may typically be provided to reduce the pressure of the water downstream 153 of valve 156. As discussed herein, this desired loss of pressure may comprise a loss of useful energy; however, aspects of the present invention can be used to provide at least some, if not all, of the desired pressure reduction while recovering—compared to losing—and using some of the energy of the lost pressure for generating electrical energy and hydrogen gas.

For example, according to one aspect of the invention, system 100 (or system 50 or system 10) may access water main 104 upstream of pressure relief valve 156 and extract at least some of the energy in the upstream flow 152 by directing flow through turbine/generator 102, extracting at least some energy from the flow, and then returning the remaining energy to water main 104, for example, via one or more conduits 125 and one or more valves 109, at a lower pressure to downstream flow 153.

In one aspect of the invention, the energy extracted by system 100, for example, by turbine/generator 102 and electrolyzer 108 (and related piping, valves, and fittings), may be substantially the same as the desired pressure drop across pressure relief valve 156 to provide the desired pressure in downstream flow 153. In another aspect, the energy extracted by system 100 may be less than the desired pressure drop across pressure relief valve 156 to provide the desired pressure in downstream flow 153, and the difference (now typically less than the pressure drop required without the presence of system 100) may be provided by regulating the pressure drop across pressure relief valve 156, for example, less than the pressure relief provided without the presence of system 100. In one aspect, the control and regulation of the pressure drop across pressure relief valve 156 and the pressure drop across system 100 may be monitored and regulated by control system 130, for example, with the use of appropriate pressure sensors in communication with control system 130 and located in or about water main 104 in the vicinity of upstream flow 152 and in the vicinity of downstream flow 153.

As shown in FIG. 3, the conduits or pipes of system 100 (or of system 50 or of system 10) may access water main 104 via one or more tee fittings or spools 162. Tee fittings 162 may be flanged fittings that may be used to introduce water from water main 104, for example, after upstream flow 152 is shut off or isolated, to and from the conduits or pipes of system 100.

FIG. 4 is a schematic side elevation view of an arrangement 200 of an enclosure or "vault" 202 containing a system 210 for producing hydrogen gas according to a further aspect of the invention. In one aspect, system 210 may include at least some of the components of system 10 shown in FIG. 1, system 50 shown in FIG. 2, and/or system 100 shown in FIG. 3. FIG. 5 is a schematic plan view of the arrangement 200 of enclosure 202 containing system 210 shown in FIG. 5.

As shown in FIGS. 4 and 5, according to an aspect of the invention system 210 may be housed in one or enclosures or "vaults" 202, for example, a pre-fabricated enclosure or housing or an enclosure or housing fabricated on site. For example, among other conventional materials, enclosure 202 may be fabricated from cinder blocks or poured concrete, with appropriate, rebar as is typical. In one aspect, enclosure 202 may be positioned above ground, partially in ground, or substantially totally belowground. Ground elevation is indicated by ground elevation 203 in FIG. 4.

As shown most clearly in FIG. 4, enclosure 202 may include conventional devices or structure to access and/or vent enclosure 202. For example, enclosure 202 may include an access door or hatch 201, an access and egress ladder 221 located beneath access door 201, and a vent conduit 223.

According to aspect of the invention, arrangement 200 may include one or more hydrogen gas dispensing stations or devices 204 positioned and adapted to dispense hydrogen gas to, for example, hydrogen fueled vehicle (not shown). The one or more hydrogen gas dispensing devices 204 may be located proximate the enclosure 202 or at a remote location, for example, within a radius to which hydrogen gas can be transferred via piping (not shown) without undue inconvenience or loss of pressure, for example, with or without storage (not shown).

As shown in FIGS. 4 and 5, system 210 in enclosure 202 may typically include one or more turbine/generators 212, in this case, a turbine 213 coupled to a generator 215. Turbine 213 includes an inlet 217 adapted to receive pressurized water from a source of pressurized water, such as, from water main 214 via pipe 205 and valves 207 and 209, and a turbine outlet 219. Generator 215 is adapted to produce electrical energy at one or more electrical outlets 206 and power, among other things, one or more electrolyzers 208. As disclosed herein electrolyzer 208 is adapted to receive electrical energy from the turbine/generator 212, for example, via wire or cable 211 and to electrolyze water and produce at least some hydrogen gas ($H_2$), and typically some oxygen gas ($O_2$). As shown in FIGS. 4 and 5, electrolyzer 208 may typically include at least one hydrogen gas outlet 220 and at least one oxygen gas outlet 222. As shown in FIGS. 4 and 5, in one aspect, the outlet 219 from turbine 213 may be directed to water main 203, for example, via one or more valves 224, for example, a control valve, and one or more pipes 226. The components of system 200 shown in FIGS. 4 and 5 may have all the attributes of the corresponding components of system 10 shown in FIG. 1, system 50 shown in FIG. 2, and system 100 shown in FIG. 3.

As shown in FIGS. 4 and 5, the electrolyzer 208 typically has an inlet operatively connected to a source of pressurized water, such as, the water main 214. Water from water main 214 may be introduced to electrolyzer 208 via one or more pipes or conduits 205, 228, and 230 and one or more valves 232. As is typical of other systems disclosed herein, the water introduced to electrolyzer 208 may also typically be treated before being introduced to electrolyzer 208, for example, via one or more processes, such as purification and/or deionization, as indicated by deionizer 234. In one aspect of the invention, the operation of electrolyzer 208 and/or deionizer 234, and of any electrolyzer or deionizer disclosed herein, may be enhanced due the source of the water introduced to electrolyzer 208 and/or deionizer 234. For example, it is envisioned that, according to aspects of the invention, since the water introduced to electrolyzer 208 and/or deionizer 234 is inherently pressurized, the pressure of the water introduced to electrolyzer 208 and/or deionizer 234 may enhance or improve the operation of electrolyzer 208 and/or deionizer 234, for example, compared to an electrolyzer or deionizer supplied with water that is typically less pressurized. For example, it is envisioned that the inherent pressure of the water introduced to electrolyzer 218 may enhance the operation or output (of hydrogen gas and/or oxygen gas) of a PEM, an AEM, or an alkaline electrolyzer, as known in the art.

As shown most clearly in FIG. 4, the hydrogen gas from the outlet 220 of electrolyzer 208 may be forwarded via pipe or conduit 236 to one or more storage devices (not shown) and/or to or one or more dispensers 204, for example, to fuel a hydrogen-powered vehicle (not shown). In one aspect, not shown in FIGS. 4 and 5, the hydrogen gas produced by electrolyzer 208 may be compressed or pressurized, for example, prior to storage. In one aspect, the hydrogen gas from electrolyzer 208 may be compressed to at least 500 bar [~7,250 psig], but typically to between 700 bar [~10,000 psig] and 1000 bar [~14,500 psig], for example, for storage under pressure in storage.

In one aspect, the electrolyzer 208 may also be adapted to produce at least some oxygen gas ($O_2$), discharge oxygen gas from outlet 222, and direct the oxygen gas via one or more pipes or conduits 242 to one or more storage devices or uses 240 (shown in phantom). For example, device 240 may be an ozone generator, and the ozone produced may be used for water treatment, among other uses of oxygen and/or ozone gas. In one aspect, the ozone gas generated may be used a mining operation, for example, for use in enhancing the extraction of gold or other metals; and/or for steel production, among other uses of the ozone gas.

As shown in FIGS. 4 and 5, system 210 may typically be introduced to a water distribution system, for example, to an existing water distribution system, as indicted by water main 214, in the vicinity of a pressure relief valve (PRV) 244. For example, in one aspect, system 210 may be introduced to the same enclosure 202 housing an existing PRV 244 or to a separate enclosure 202 in the vicinity of the location of PRV 244.

In one aspect of the invention, system 210 may be introduced where the piping of system 210 may be used to by-pass PRV 244. For example, as shown in FIGS. 4 and 5, water from a new or existing pipe 205 from water main 214 may be directed to PRV 244 via conduits 205 and 245, such as, through a valve 246, and may be discharged from PRV 244 via pipe 203, for example, such as, via valves 247 and 248. As shown in FIGS. 4 and 5, the piping of system 210 may bypass PRV 244 by receiving flow from pipe 205 and 249 to the inlet 217 of turbine 213 and then, after transferring at least some energy from the pressure of the water, discharging the water from outlet 219 to pipe 226 and 203. The flow from outlet 219 of turbine 213 then may be combined with the flow from PRV 244 in pipe 203 and forwarded, for example, to the water distribution system, for example, an existing water distribution system, having pipe 214.

In a fashion similar to system 100 shown in FIG. 30 and to system 50 shown in FIG. 2, in one aspect of the invention, system 210 shown in FIGS. 4 and 5 may typically include a control system 250. Control system 250 may typically include a controller 252 and numerous control and monitoring connections distributed about system 210 and communicating, by wire or wirelessly, with controller 252. According to aspects of the invention, control system 250 may be used to monitor, control, and/or optimize the operation of system 210. For example, in one aspect, control system 252 may be used to optimize the generation, production, and/or availability of hydrogen gas to, for example, provide a desirable "just in time" availability of hydrogen gas, for instance, for one or more hydrogen powered vehicles. Controller 252 may comprise one or more programmable logic controllers (PLCs), computer processors, and related hardware and software.

According to aspects of the invention, system 210 shown in FIGS. 4 and 5 may include various sensors and actuators that, with connectivity to controller 252, may be used to operate, manipulate, and optimize the operation of system 210. For example, in one aspect, valves 207, 209, 224, 246, 248, and/or 232 may include automated controllers, such as, electro/pneumatic actuators, that can be monitored and controlled by controller 252, for example, based upon user input and/or computer algorithm. In another aspect, the hydrogen outlet 220 of electrolyzer 208 may include one or more sensors, for example, one or more pressure sensors, flow sensors, hydrogen concentration sensors, and/or temperature sensors, among other sensors that may be used. In another aspect, the oxygen gas outlet 222 from electrolyzer 208 may include one or more sensors, for example, pressure sensors, flow sensors, oxygen concentration sensors, and/or temperature sensors, among other sensors that may be used. The sensors may communicate to controller 252 (via wired or wireless communication (not shown) for use in controlling the operation of system 210.

Figure 6:
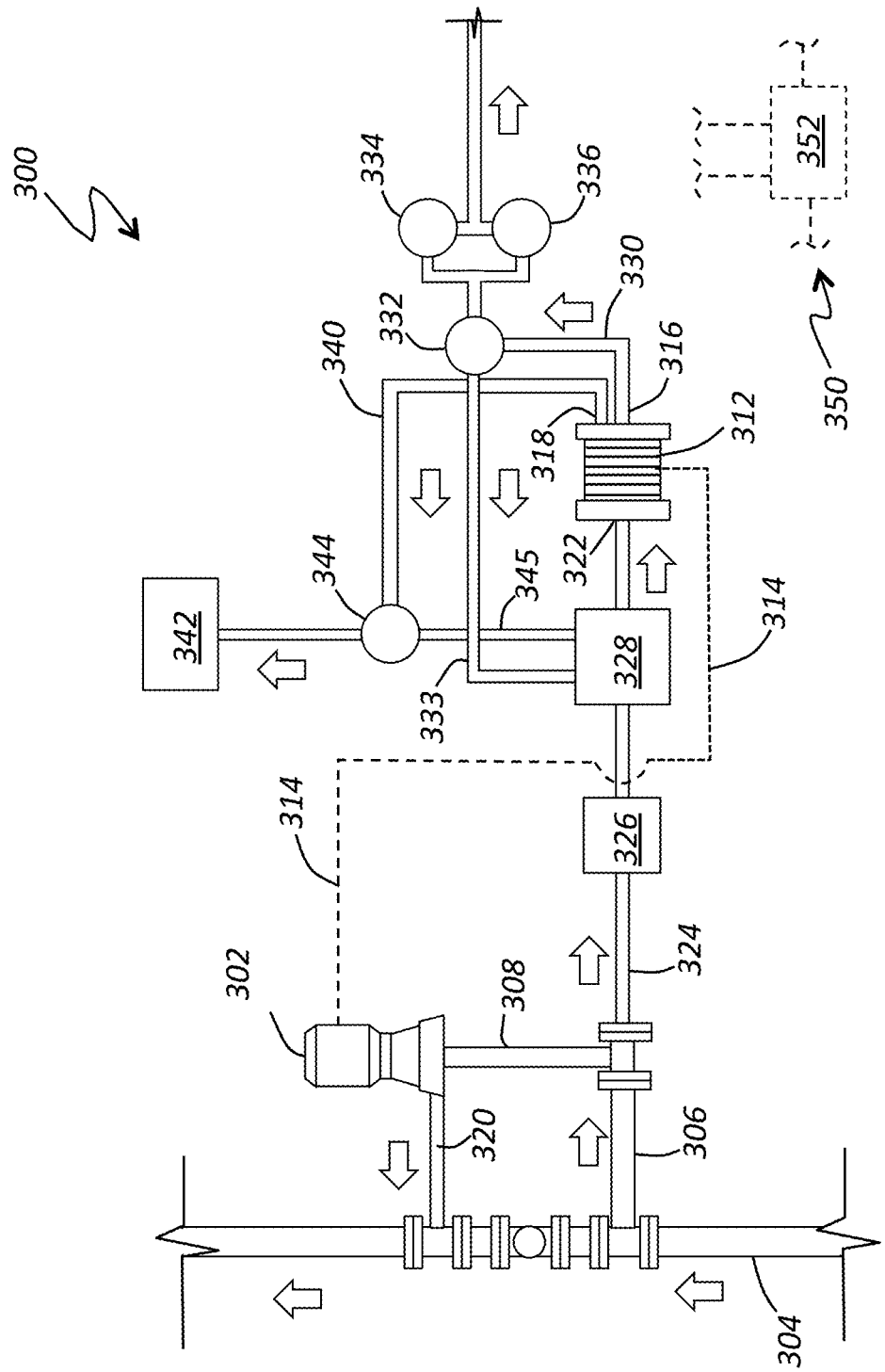
FIG. 6 is a schematic diagram of a system for producing hydrogen gas according to another aspect of the invention.

FIG. 6 is a schematic diagram of a system 300 for producing hydrogen gas according to a further aspect of the invention. As shown in FIG. 6, system 300 may include one or more turbine/generators 302, as disclosed herein, for example, a turbine coupled to a generator. Turbine/generator 302 includes an inlet operatively connected to a source of pressurized water, such as, from water main 304 via pipes 306 and 308, and one or more valves (not shown). Turbine/generator 302 may be adapted to produce electrical energy at one or more electrical outlets and power, among other things, one or more electrolyzers 312, for example, via electrical connection 314. As disclosed herein electrolyzer 312 is adapted to receive electrical energy from the turbine/generator 302, for example, via wires or cable 314 and to electrolyze water and produce at least some hydrogen gas ($H_2$), and typically at least some oxygen gas ($O_2$). As shown in FIG. 6, electrolyzer 312 may typically include at least one hydrogen gas outlet 316 and at least one oxygen gas outlet 318. As shown in FIG. 6, in one aspect, the water outlet from turbine/generator 302 may be directed to water main 304 via one or more pipes or conduits 320, and, for example, via one or more valves (not shown). The components of system 300 shown in FIG. 6 may have all the attributes of the corresponding components of system 10 shown in FIG. 1, system 50 shown in FIG. 2, system 100 shown in FIG. 3, and system 200 shown in FIGS. 4 and 5.

As shown in FIG. 6, the electrolyzer 312 typically has an inlet 322 operatively connected to a source of pressurized water, such as, to the water main 304. Water from water main 304 may be introduced to inlet 322 of electrolyzer 312 via one or more pipes or conduits 306 and 324 and one or more valves (not shown). As is typical of other systems disclosed herein, the water introduced to electrolyzer 312 may also typically be treated before being introduced to electrolyzer 312, for example, via one or more processes, such as purification, deionization, and/or storage, as indicated by deionizer 326 and storage tank 328.

As shown in FIG. 6, the hydrogen gas from the outlet 316 of electrolyzer 312 may be forwarded via one or more pipes or conduits 330 to one or more storage containers, to one or more treatments, and/or to one or more dispensers (not shown), for example, to fuel a hydrogen-powered vehicle (not shown). In one aspect, not shown in FIG. 6, the hydrogen gas produced by electrolyzer 312 may be compressed or pressurized, for example, prior to storage. In one aspect, the hydrogen gas from electrolyzer 312 may be compressed to at least 500 bar [~7,250 psig], but typically to between 700 bar [~10,000 psig] and 1000 bar [~14,500 psig], for example, for storage under pressure.

As shown in FIG. 6, in one aspect, the hydrogen gas from the outlet 316 of electrolyzer 312 may be forwarded via one or more pipes or conduits 330 to one or more hydrogen separators 332 and/or to one or more demisters 334 and 336. As known in the art, hydrogen separator 332 may be used to isolate and purify hydrogen gas from a gas stream containing hydrogen and other, typically, undesirable gases, for example, by membrane filtration. As shown in FIG. 6, in one aspect, hydrogen separator 332 may receive a flow of water from storage tank 328 via pipe or conduit 333. In one aspect, hydrogen separator 332 may be included as a component of the electrolyzer 312 when electrolyzer 312 is provided as a system. As known in the art, one or more demisters 334 and 336 may be used to remove or minimize the presence of liquids from a gas stream containing hydrogen and, typically, undesirable liquids. In one aspect, demisters 334 and 336 may be included as a component of the electrolyzer 312 when electrolyzer 312 is provided as a system.

In one aspect, the electrolyzer 312 may also be adapted to produce at least some oxygen gas ($O_2$), discharge oxygen gas from outlet 318, and direct the oxygen gas via one or more pipes or conduits 340 to one or more storage devices or uses 342, for example, device 342 may be an ozone generator, and the ozone produced may be used for water treatment, among other uses of oxygen and/or ozone gas. In one aspect, prior to forwarding the oxygen gas to storage or use 342, the oxygen gas may be treated in a treatment device 344, for example, an oxygen separator. As known in the art, oxygen separator 344 may be used to isolate and purify oxygen gas from a gas stream containing oxygen gas and other, typically, undesirable gases, for example, by membrane filtration. As shown in FIG. 6, in one aspect, oxygen separator 344 may receive a flow of water from storage tank 328 via pipe or conduit 345.

As shown in FIG. 6, system 300 may typically be introduced to a water distribution system, for example, to an existing water distribution system, as indicted by water main 304, for example, near or in the vicinity of a pressure relief valve (not shown). For example, in one aspect, system 300 may be introduced to the same enclosure or vault housing an existing PRV or to a separate enclosure in the vicinity of the location of a PRV.

In a fashion similar to system 100 shown in FIG. 2, to system 50 shown in FIG. 2, to system 100 shown in FIG. 3, and to system 210 shown in FIGS. 4 and 5, system 300 shown in FIG. 6 may typically include a control system 350 (shown in phantom). The control system 350 for system 300 may typically include a controller 352 (shown in phantom) and numerous control and monitoring connections distributed about system 300 and communicating with controller 352, by wire or wirelessly. According to aspects of the invention, the control system 350 may be used to monitor, control, and/or optimize the operation of system 300.

According to aspects of the invention, system 300 shown in FIG. 6 may include various sensors and actuators that, with wired and/or wireless connectivity to the controller 352 of the control system 350 of system 300, may be used to operate, manipulate, and optimize the operation of system 300.

Figure 7:
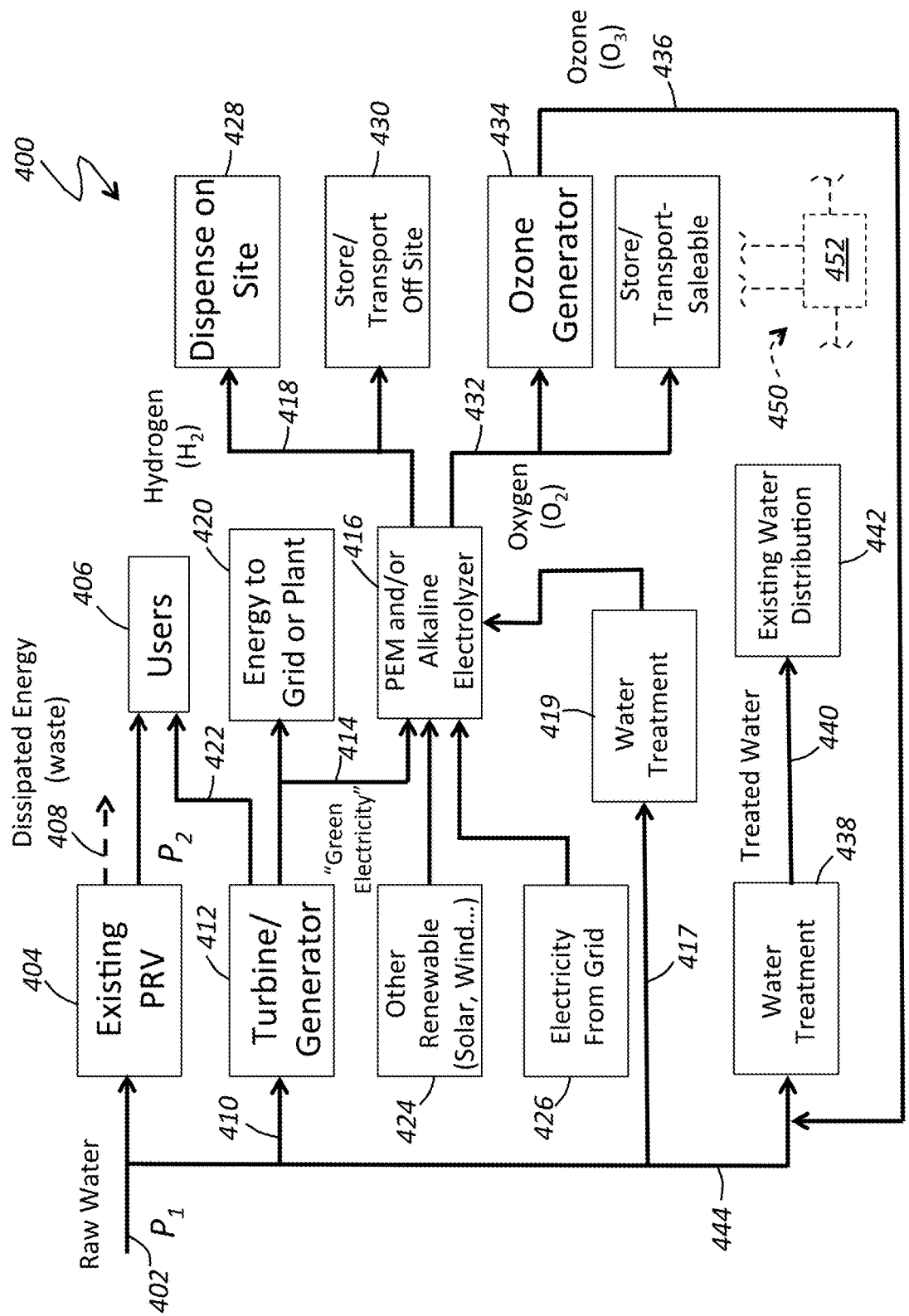
FIG. 7 is a schematic block diagram of a system and method for producing hydrogen gas according to an aspect of the invention.

FIG. 7 is a schematic block diagram 400 of a system and method for producing hydrogen gas according to another aspect of the invention. Block diagram 400 includes many of the devices and processes shown in the systems illustrated in FIGS. 1 through 6. As shown in FIG. 7, and as is typical of some aspects of the invention, water 402, for example, "raw water" or water from any of the water sources, water distribution systems, or water distribution networks disclosed herein, may typically be introduced to some form of pressure variation device 404, for example, a pressure relief valve (PRV), to reduce the available water, $P_1$, to a desired water pressure, $P_2$, for use by end users 406, for example, a home owner, a business, a factory, or a hospital. According to conventional practice, to achieve this desired pressure drop, $\Delta P (=P_1-P_2)$ or "fall-off pressure," at least some water pressure 408 may be dissipated by a flow restriction of the PRV 404 and/or discharged, for example, to a pressure relief tank or surge control tank (not shown). According to aspects of the invention, $\Delta P$ may range from 1 psig to 500 psig, but may typically range from 5 to 50 psig, for example, from 5 psig to 20 psig. As disclosed herein, according to aspects of the invention, the inherent loss or waste of this dissipated or discharged energy 408 may be captured, for example, at least partially captured, and used to generate hydrogen gas, for example, for use as a hydrogen gas fuel. Moreover, by employing aspects of the invention, the distribution of the hydrogen gas generated may be conveniently provided at the locations where the hydrogen gas is most likely to be needed—that is, for example, at or along existing water distribution systems. In FIG. 7, the dissipated or discharged energy 408 is shown in phantom since, according to an aspect of the present invention, discharged waste energy 408 may be reduced, and, in some aspects, substantially eliminated entirely. In addition, in some aspects, at least some of the waste energy 408, when the power requirements of system 400 are otherwise met, may be directed for other uses, for example, to a local or remote electrical grid.

As disclosed herein, and summarized in the block diagram 400 of FIG. 7, instead of wasting the energy contained in the water 402 of a water system, the water 402 may be directed 410 to one or more turbine/generators 412, as disclosed herein, to generate electrical power or "green electricity" 414 to power, among other things, one or more electrolyzers 416 to produce hydrogen gas 418. As disclosed herein, the one or more electrolyzers 416 may be a PEM-type electrolyzer, an alkaline-type electrolyzer, and/or an AEM-type electrolyzer, among others. The water introduced to electrolyzer 416 for electrolyzation may be obtained from water 402 as indicated by pipe or conduit 417. As disclosed herein, prior to introduction to electrolyzer 416, the water in pipe 417 may be treated 419, for example, by purification and/or deionization as disclosed herein. As shown in FIG. 7, at least some of the green electricity 414 produced by electrolyzer 416 may be directed to the local electrical grid or a local plant or factory 420. In one aspect, though not shown in FIG. 7, the green electricity 414 may also be used to power other processes or devices related to the disclosed invention, for example, those identified in block diagram 400.

According to aspects of the invention, as shown in FIG. 7, the water 422 discharged from turbine/generator 412, that is, after green energy 414 has been extracted from the water 402, may be returned to, for example, the water distribution system and users 406. For example, in one aspect, the effect of aspects of the invention, for example, as shown in FIG. 7, may have little or no effect upon the operation and availability of water to end users 406, while providing a source of hydrogen gas 418. In one aspect, the implementation of systems and methods of the present invention may be substantially completely "transparent" or have not noticeable impact upon the operation of an existing water distribution system in to which aspects of the invention are provided.

As shown in FIG. 7, the one or more electrolyzers 416 may also receive electric power from renewable sources of energy 424, for example, from photovoltaic panels (that is, solar), wind turbines, and/or hydroelectric power, among other renewable sources of electric power. In one aspect, the one or more electrolyzers 416 may also receive power from a local electric grid or power station 426, for example, to facilitate startup or shutdown of aspects of the invention.

According to aspects of the invention, the hydrogen gas 418 generated by the one or more electrolyzers 416 may be forwarded to an appropriate hydrogen gas dispensing device or system 428 as disclosed herein, for example, for dispensing to a hydrogen powered vehicle. In one aspect, the hydrogen gas 418 may be forwarded to one or more storage tanks or to transport 430, for example, to local or remote storage tanks or to an appropriate tanker truck or tanker train car for remote delivery. Though not shown in FIG. 7, in one aspect, before dispensing 428 or storage 430, the hydrogen gas 418 may be treated, for example, with a hydrogen gas separator and/or with a hydrogen gas compressor, as disclosed herein.

According to one aspect of the invention, as shown in FIG. 7, the one or more electrolyzers 416 may also generate at least some oxygen gas 432. In one aspect, the oxygen gas 432 produced may be forwarded to an ozone generator 434 to generate ozone gas 436. The ozone gas 436 may be used where needed, for example, for water treatment, disinfection, or bleaching, for example, of paper pulp, among other uses. In one aspect, as shown in FIG. 7, the ozone gas 436 generated may be used for water treatment 438 and then the treated water 440 may be forwarded to a water distribution system 442, for example, an existing water distribution system, such as, a drinking water distribution system. In one aspect, the water treated 438 with the ozone gas 436 may be from the same water source 402 from which water is introduced to turbine/generator 412, for example, via one or more pipes or conduits 444. In one aspect, the ozone gas 432 may be used in a mining operation, for example, for use in enhancing the extraction of gold or other metals; and/or for steel production, among other uses of the ozone gas.

Similar to other systems disclosed herein, the methods and devices represented in block diagram 400 may typically include a control system 450 (shown in phantom). The control system 450 may typically include a controller 452 (shown in phantom) and numerous control and monitoring connections distributed about the components of block diagram 400 and communicating, by wire or wirelessly, with controller 452. According to aspects of the invention, the control system 450 may be used to monitor, control, and/or optimize the operation of the systems and methods of block diagram 400. For example, control system 450 with various sensors and actuators that, with connectivity, wired or wireless, to the controller 452 of the control system 450, may be used to operate, manipulate, and optimize the operation of systems and methods of block diagram 400.

According to aspects of the invention, turbine/generator 12, 16, 52, 56, 102, 212, 302, and 412 may be any device adapted to receive a flow of pressurized fluid, for example, water, and generate at least some electrical energy, that is, electric energy capable of powering at least one of the electrolyzers disclosed herein. Turbine/generator 12, 16, 52, 56, 102, 212, 302, and 412 may comprise an integrated turbine and generator combination and/or a individual, separate turbine coupled to an individual, separate generator. For example, in one aspect, turbine/generator 12, 16, 52, 56, 102, 212, 302, and 412 may comprise an integrated turbine/generator, for instance, an integrated turbine generator provided by Rentricity Inc. of New York, New York, and marketed under the name FLOW-2-WIRE™ turbine/generator, or its equivalent.

According to another aspect of the invention, turbine/generator 12, 16, a generator, for example, a AC and/or DC generator, coupled to a 52, 56, 102, 212, 302, and 412 may include an individual turbine coupled to a generator, for example, a turbine provided by Cornell Pump Company of Clackamas, Oregon, or its equivalent. In another aspect turbine/generator 12, 16, 52, 56, 102, 212, 302, and 412 may include turbine, for example, a generator provided by US Motor Works of Santa Fe Springs, California or by Baldor Electric of New Preston, Connecticut, or its equivalent.

According to aspects of the invention, electrolyzers 18, 58, 108, 208, 312, and 416 may be any devices adapted to decompose water ($H_2O$) to at least some hydrogen gas ($H_2$); however, typically, electrolyzer 18, 58, 108, 208, 312, and 416 may also produce at least some oxygen gas ($O_2$). As noted above, electrolyzers 18, 18, 58, 108, 208, 312, and 416 may be an alkaline-type electrolyzer, a PEM-type electrolyzer, or an AEM-type electrolyzer, or any other commercially available electrolyzer. For example, in one aspect, electrolyzers 18, 58, 108, 208, 312, and 416 may be an electrolyzer provided by Plug Power, of Latham, New York; by NEL ASA, of Oslo, Norway; by Millennium Reign Energy LLC, of Dayton, Ohio; or by Hydrogenix-Cummings, of Columbus, Indiana, among others.

In one aspect, electrolyzers 18, 58, 108, 208, 312, and 416 may be one of Plug Power's GenFuel® electrolyzers, for example, an Allagash™ electrolyzer, a Merrimack™ electrolyzer, or their equivalent. In one aspect, electrolyzers 18, 58, 108, 208, 312, and 416 may be one of NEL ASA's A-Series electrolyzer or M-Series electrolyzer. In one aspect, electrolyzers 18, 58, 108, 208, 312, and 416 may be one of Millennium Reign Energy's AutoARK® electrolyzers, or their equivalent. In one aspect, electrolyzers 18, 58, 108, 208, 312, and 416 may be one of Hydrogenix-Cummings's HySTAT™ electrolyzers or HyLYZER™ electrolyzers, or their equivalent. In one aspect of the invention, electrolyzers 18, 58, 108, 208, 312, and 416 may comprise a system including one or more of the components in FIGS. 1 through 7, for example, electrolyzers 18, 58, 108, 208, 312, and 416 may include a water purification device, a deionizer device, a hydrogen gas purifier, controllers, and/or sensors, among other related components shown in FIGS. 1 through 7.

Table I presents some representative operating parameters of some aspects of the invention. The configurations represented in Table I are based upon available in-pipe water flow (for example, 1900-6500 gpm), an excess pressure (for example, 20-100 psig), a turbine efficiency (for example, nominally 80%), an assumed variable duty cycle (for example, 18-24 hours per day), an average efficiency and output from both a PEM-type electrolyzer and an alkaline-type electrolyzer, and a requirement to produce 1 kilogram of hydrogen gas ($H_2$) from an electrolyzer.

In the following discussion, in order to facilitate the identification of the columns in Table I, the columns in Table I are identified by the letters that appear above each column in Table I.

TABLE I

Typical Hydrogen Gas Production Rates for Aspects of the Present Invention

| Config-uration A | Target $H_2$ Rate [kg/d] B | Req. Power [kW-h/d] C | Turbine/ Generator Power [kW] D | Grid/ Other [kW] E | Operating Hours [h/d] F | $H_2$ Water [g/d] G | Target Hydr'lics [gpm/psig] H |
|---|---|---|---|---|---|---|---|
| Small | 17 | 952 | 40 | 0 | 23.8 | 39.1 | >1,900/60 |
|  | 36 | 2,016 | 110 | 0 | 18.3 | 82.8 |  |
| Medium | 43 | 2,580 | 110 | 0 | 23.5 | 98.9 | >4,000/80 |
|  | 68 | 4,080 | 225 | 0 | 18.1 | 156.4 |  |
| Large | 80 | 5,200 | 225 | 0 | 23.1 | 184 | >6,500/100 |
|  | 200 | 13,000 | 225 | 350 | 22.6 | 460 |  |
|  | 500 | 32,500 | 600 | 800 | 23.2 | 1150 |  |

As shown in column A in Table I, systems or methods according to aspects of the invention may be separated based upon the "Target Hydrogen Production Rate" identified in column B of Table I, for example, in units of kilograms per day [kg/d]. For example, one aspect of the invention may be identified as having a "Small" configuration, as shown in column A, when a system or a method provides a "Target Hydrogen" production rate from about 10 kg/d to 40 kg/d, for example, 17 kg/d and 36 kg/d as shown in column B. Similarly, one aspect of the invention may be identified as having a "Medium" configuration, as shown in column A, when a system or a method provides a "Target Hydrogen" production rate of from 40 kg/d to 75 kg/d, for example, 43 kg/d and 68 kg/d as shown in column B. One aspect of the invention may be identified as having a "Large" configuration, as shown in column A, when a system or a method provides a "Target Hydrogen" production rate of from about 75 kg/d to 1000 kg/d, for example, 80 kg/d, 200 kg/d, and 500 kg/d as shown in column B. In one aspect of the invention, the "Target Hydrogen" production rate may range from 1 kg/d to 10,000 kg/d, but typically ranges from 10 kg/d to 1,000 kg/d.

As also shown in Table I, representative operating parameters for Small, Medium, and Large systems of methods are listed in columns C, D, E, F, G, and H. Specifically, in one aspect, column C of Table I identifies typical "Required Power" in units of kilowatt-hours per day [kW-h/d]. According to aspects of the invention, the "Required Power" is the power needed to produce the target hydrogen rate shown in column B by electrolysis, as described herein, in 1 day, for example, based on the operating hours per day indicated in column F.

In one aspect of the invention, the "Required Power" for a "Small" configuration, as shown in column C, may range from about 500 kW-h/d to 2,500 kW-h/d, for example, 952 kW-h/d and 2,016 kW-h/d, as shown in column C. Similarly, in one aspect, a "Medium" configuration, as shown in column C, may have a Required Power ranging from about 2,500 kW-h/d to 5,000 kW-h/d, for example, 2,580 kW-h/d and 4,080 kW-h/d, as shown in column C. In one aspect, a "Large" configuration, as shown in column C, may have a Required Power ranging from about 5,000 kW-h/d to 50,000 kW-h/d, for example, 5,200 kW-h/d, 13,000 kW-h/d, and 32,500 kW-h/d, as shown in column C. In one aspect of the invention, the Required Power may range from about 100 kW-h/d and 100,000 kW-h/d, but may typically range from 500 kW-h/d to 50,000 kW-h/d.

In one aspect, column D of Table I identifies typical "Turbine/Generator Power" in units of kilowatts [KW]. According to aspects of the invention, the "Turbine/Generator Power" is the power provided by the turbine/generator to produce the target hydrogen rate shown in column B by electrolysis, as described herein, in 1 day, for example, based on the operating hours per day indicated in column F.

In one aspect of the invention, the "Turbine/Generator Power" for a "Small" configuration, as shown in column D, may range from about 20 kW to 120 kW, for example, 40 kW and 110 KW, as shown in column D. Similarly, in one aspect, a "Medium" configuration, as shown in column D, may have a Turbine/Generator Power ranging from about 100 kW to 250 kW, for example, 110 kW and 225 kW as shown in column D. In one aspect, a "Large" configuration, as shown in column D, may have a Turbine/Generator Power ranging from about 200 kW to 1,000 kW, for example, 225 kW and 600 kW, as shown in column D. In one aspect of the invention, the Turbine/Generator Power may range for from about 10 kW to 10,000 kW, but may typically range from 20 kW to 1,000 kW.

In one aspect, column E of Table I identifies typical "Grid or Other Power" in units of kilowatts [kW]. According to aspects of the invention, the "Grid or Other Power" is the external power required to operate systems or methods according to aspects of the invention should the power generated by the turbine/generator not be sufficient to power, and/or supplement the power, needed by the electrolyzer and other devices of the systems of the invention. As shown in Table I, it is envied envisioned that this external power may only be needed for larger capacity systems according aspects of the invention.

In one aspect of the invention, the "Grid or Other Power" for a "Small" configuration, as shown in column E, may range from about 0 kW, that is, substantially no external power required, to 50 kW, for example, 0 kW as shown in column E. Similarly, in one aspect, a "Medium" configuration, as shown in column E, may have a Grid or Other Power ranging from about 0 kW to 250 kW, for example, 0 kW, as shown in column E. In one aspect, a "Large" configuration, as shown in column E, may have a Grid or Other Power ranging from about 0 kW to 1,000 kW, for example, 0 kW, 350 kW, and 800 kW, as shown in column E. In one aspect of the invention, the Grid or Other Power may range from about 0 kW to 5,000 kW, but may typically range from 0 kW to 1,000 kW. In one aspect, excess power generated by aspects of the invention may be used to provide at least some power to an external power network or user, such as, the local power grid.

In one aspect, column F of Table I identifies typical "Operating Hours" in units of hours per day [h/d]. According to aspects of the invention, the "Operating Hours" is the typical number of hours per day that systems or methods according to aspects of the invention may operate.

In one aspect of the invention, the "Operating Hours" for a "Small" configuration, as shown in column F, may range from about 12 h/d to 24 h/d, for example, 18.3 h/d and 23.8 h/d, as shown in column F. Similarly, in one aspect, a "Medium" configuration, as shown in column F, may have Operating Hours ranging from about 12 h/d to 24 h/d, for example, 18.1 h/d and 23.5 h/d, as shown in column F. In one aspect, a "Large" configuration, as shown in column F, may have Operating Hours ranging from about 20 h/d to 24 h/d, for example, 23.1 h/d, 22.6 h/d, and 23.2 h/d, as shown in column F. In one aspect of the invention, the Operating Hours may range from about 6 h/d to 24 h/d, but may typically range from 20 h/d to 24 h/d.

In one aspect, column G of Table I identifies typical "Hydrogen ($H_2$) Water" produced in units of gallons per day [g/d]. According to aspects of the invention, the "Hydrogen ($H_2$) Water" produced is the quantity of water required to the inlet of the electrolyzer per 24 hour period.

In one aspect of the invention, the "Hydrogen Water" produced for a "Small" configuration, as shown in column G, may range from about 20 g/d to 100 g/d, for example, 39.1 g/d and 82.8 g/d, as shown in column G. Similarly, in one aspect, a "Medium" configuration, as shown in column G, may have "Hydrogen Water" produced ranging from about 100 g/d to 200 g/d, for example, 98.9 g/d and 156.4 g/d, as shown in column G. In one aspect, a "Large" configuration, as shown in column G, may have a "Hydrogen Water" produced ranging from about 200 g/d to 1,500 g/d, for example, 184 g/d, 460 g/d, and 1,150 g/d, as shown in column G. In one aspect of the invention, the Hydrogen Water" produced may range from about 10 g/d to 5,000 g/d, but may typically range from 10 g/d to 1,500 g/d.

In one aspect, column H of Table I identifies typical "Target Hydraulics" required in units of gallons per minute [gpm] and pounds per square inch gauge [psig]. According to aspects of the invention, the "Target Hydraulics" required is the approximate flow and pressure required to drive the turbine/generator to generate sufficient electrical power to power the electrolyzer and produce the target hydrogen rate shown in column B according to aspects of the invention.

In one aspect of the invention, the "Target Hydraulics" provided for a "Small" configuration, as shown in column H, may range about 1000 gpm to 3000 gpm, for example, 1,900 gpm, as shown in column H, and a pressure from about 40 psig to 100 psig, for example, 60 psig, as shown in column H. Similarly, in one aspect, a "Medium" configuration, as shown in column H, may have "Target Hydraulics" provided may range from about 3000 gpm to about 6000 gpm, for example, 4,000 gpm as shown in column H, and a pressure of about 60 psig and 100 psig, for example, 80 psig, as shown in column H. In one aspect, a "Large" configuration, as shown in column H, may have a "Target Hydraulics" provided may range from about 6000 gpm to about 8,000 gpm, for example, 6,500 gpm, as shown in column H, and a pressure of about 80 psig and 120 psig, for example, 100 psig, as shown in column H. In one aspect of the invention, the "Target Hydraulics" provided may range between about 10 gpm and 20,000 gpm, but may typically range from 100 gpm to 10,000 gpm. In one aspect of the invention, the "Target Hydraulics" provided may range between about 10 psig to 500 psig, but may typically range from 50 psig and 300 psig.

Embodiments of the present invention, in their many aspects, provide systems and methods for producing hydrogen gas to, for example, serve the expected, expanding hydrogen infrastructure. As disclosed herein, aspects of the invention take advantage of the typical ubiquitous water distribution systems and networks, for example, existing systems and networks, that can provide a source of energy to convert water to hydrogen gas and oxygen gas. Since many of these water distribution systems, be they municipal, commercial, industrial, and/or agricultural, are not only existing but may be located where hydrogen gas consumers are likely located, aspects of the present invention may uniquely both satisfy the nascent need for hydrogen gas supplies while cost-effectively distributing the hydrogen gas generated to the end users.

Aspects of the present invention are believed to provide sustainable, water-powered hydrogen generations systems and methods that can be deployed for any hydrogen gas application, for example, for hydrogen-fueled vehicle and cars and for hydrogen-fueled fleets of vehicles. For example, it is envisioned that aspects of the present invention may be used or adapted to power fuel-cell powered vehicles, such as, forklifts, drones, planes, ships, and non-traditional vehicles, such as, tugboats and plane movers (for example, "tuggers"), and the like. It is envisioned that aspects of the invention may be located in or adjacent to existing water infrastructure operations, for example, at fuel depots, gas stations, commercial buildings, industrial plants, and agricultural operations, and may use existing enclosures, vaults, and/or tanks adjacent to existing water infrastructure or industrial water facilities. In one aspect of the invention, two or more systems, as disclosed herein, may be installed in series and electric power extracted from multiple pressure drops across multiple in-series turbine/generators, for example, for use in deep mining applications. In one aspect, the electrical energy from multiple in-series turbine generators may power one or more electrolyzers to produce one or more sources of hydrogen gas (and oxygen gas), where the lower pressure of an upstream turbine/generator provides the input pressure and flow to a downstream turbine/generator. In another aspect, two or more systems, as disclosed herein, may be installed in parallel and electric power extracted from multiple pressure drops across multiple in-parallel turbine/generators. In one aspect, the electrical energy from multiple in-parallel turbine/generators may power one or more electrolyzers to produce one or more sources of hydrogen gas (and oxygen gas).

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "including," and/or "having" when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments discussed and shown were chosen and described in order to best explain the principles of the disclosure and the practical applications, and to enable others of ordinary skill in the art to understand the disclosure for various embodiments with various modifications as are suited to the particular use contemplated.

This written description uses examples to disclose the invention, including the best mode envisioned, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for producing hydrogen gas comprising:
   a turbine having an inlet adapted to receive a flow of pressurized water from an existing water main and produce rotational energy;
   a generator operably connected to the turbine and adapted to convert the rotational energy from the turbine to produce electrical energy;
   an electrolyzer powered by the electrical energy from the generator and adapted to electrolyze water and produce at least some hydrogen gas, the electrolyzer having an inlet operatively connected to a conduit in fluid communication with the existing water main and an outlet for the at least some hydrogen gas;
   a hydrogen dispenser accessible by a local user and operatively connected to the outlet for the at least some hydrogen gas of the electrolyzer; and
   a control system having a plurality of sensors adapted to monitor operation of the turbine and the generator and establish a duty cycle of the turbine and a duty cycle of the generator, the control system configured to associate production of the at least some hydrogen gas with at least one of the duty cycle of the turbine and the duty cycle of the generator;
   wherein the electrical energy produced by the generator from the flow of pressurized water to the turbine from the water main is sufficient to power the electrolyzer.

2. The system as recited in claim 1, wherein the turbine and the generator comprise a single, integrated device.

3. The system as recited in claim 1, wherein the existing water main comprises a conduit in at least one of a municipal water distribution system, a commercial water distribution system, an industrial water distribution system, and an agricultural water distribution system.

4. The system as recited in claim 1, wherein the electrolyzer comprises one or more of a PEM-type electrolyzer, an alkaline-type electrolyzer, and an AEM-type electrolyzer.

5. The system as recited in claim 1, wherein the local demand for hydrogen gas comprises a request by the local user.

6. The system as recited in claim 1, wherein the system further comprises a deionizer operatively connected between the existing water main and the electrolyzer.

7. The system as recited in claim 1, wherein the electrolyzer is further adapted to produce at least some oxygen gas.

8. The system as recited in claim 7, wherein the system further comprises an ozone generator adapted to receive the at least some oxygen gas and produce ozone gas.

9. The system as recited in claim 8, wherein the system further comprises a water treatment device adapted to treat water with the ozone gas.

10. The system as recited in claim 1, wherein the system further comprises an electrical connection between a local power grid and the electrolyzer.

11. The system as recited in claim 1, wherein the system further comprises a compressor operatively connected to the outlet of the electrolyzer, the compressor adapted to compress the at least some hydrogen gas.

12. The system as recited in claim 1, wherein the system further comprises an external source of electrical power operatively connected to the electrolyzer.

13. The system as recited in claim 1, wherein the control system is further configured to provide "just in time" availability of the at least some hydrogen gas to the local user.

14. The system as recited in claim 1, wherein the flow of the pressurized water comprises a flow of at least 1000 gpm.

15. The system as recited in claim 1, wherein the generator operably connected to the turbine is adapted to produce at least 20 kW of electrical power.

16. A system for producing hydrogen gas comprising:
   a turbine having an inlet adapted to receive a flow of pressurized water and produce rotational energy;
   a generator operably connected to the turbine and adapted to convert the rotational energy from the turbine to produce electrical energy;
   an electrolyzer powered by the electrical energy from the generator and adapted to electrolyze water and produce at least some hydrogen gas, the electrolyzer having an inlet operatively connected to a source of water and an outlet for the at least some hydrogen gas;
   a hydrogen dispenser accessible by a local user and operatively connected to the outlet for the at least some hydrogen gas of the electrolyzer; and
   a control system having a plurality of sensors adapted to monitor operation of the turbine and of the generator and establish a duty cycle of the turbine and a duty cycle of the generator, the control system configured to associate production of the at least some hydrogen gas with at least one of the duty cycle of the turbine and the duty cycle of the generator.

17. The system as recited in claim 16, wherein the turbine and the generator comprise a single, integrated device.

18. The system as recited in claim 16, wherein the flow of pressurized water received by the turbine is provided by a conduit in at least one of a municipal water distribution system, a commercial water distribution system, an industrial water distribution system, and an agricultural water distribution system.

19. The system as recited in claim 16, wherein the system further comprises a compressor operatively connected to the outlet for the at least some hydrogen gas of the electrolyzer, the compressor adapted to compress the at least some hydrogen gas.

20. The system as recited in claim 16, wherein the control system is further configured to provide "just in time" availability of the at least some hydrogen gas to the local user.

21. The system as recited in claim 16, wherein the flow of the pressurized water comprises a flow of at least 1,000 gpm.

22. The system as recited in claim 16, wherein the generator operably connected to the turbine is adapted to produce at least 20 kW of electrical power.

\* \* \* \* \*